(12) United States Patent
Asano et al.

(10) Patent No.: US 7,346,169 B2
(45) Date of Patent: Mar. 18, 2008

(54) INFORMATION PROCESSING DEVICE AND METHOD

(75) Inventors: Tomoyuki Asano, Kanagawa (JP); Yoshitomo Osawa, Kanagawa (JP); Ryuji Ishiguro, Tokyo (JP); Atsushi Mitsuzawa, Tokyo (JP); Tateo Oishi, Saitama (JP)

(73) Assignee: Sony Corporation (JP)

( * ) Notice: Subject to any disclaimer, the term of this patent is extended or adjusted under 35 U.S.C. 154(b) by 820 days.

(21) Appl. No.: 10/069,176

(22) PCT Filed: Jun. 21, 2001

(86) PCT No.: PCT/JP01/05327

§ 371 (c)(1),
(2), (4) Date: Jun. 13, 2002

(87) PCT Pub. No.: WO01/99333

PCT Pub. Date: Dec. 27, 2001

(65) Prior Publication Data

US 2002/0164034 A1    Nov. 7, 2002

(30) Foreign Application Priority Data

Jun. 21, 2000  (JP) .............................. 2000-186172
Jun. 21, 2000  (JP) .............................. 2000-186173
Aug. 10, 2000  (JP) .............................. 2000-243204

(51) Int. Cl.
*H09L 9/14* (2006.01)

(52) U.S. Cl. .................. 380/278; 380/45; 380/277; 380/284; 726/2; 726/26; 726/27

(58) Field of Classification Search ............ 380/44–45, 380/277–278, 281; 713/189, 193; 726/26, 726/27, 2, 30; 369/13.56
See application file for complete search history.

(56) References Cited

U.S. PATENT DOCUMENTS 4,771,459 A    9/1988   Jansen (Continued)

FOREIGN PATENT DOCUMENTS

DE    195 11 298 A1    10/1996

(Continued)

OTHER PUBLICATIONS

Lein Harn et al., "A Cryptographic Key Generation Scheme for Multilevel Data Security", Computers & Security, vol. 9, No. 6, Elsevier Science Publishers Ltd, Oxford, Great Britain, Oct. 1, 1990, pp. 539-546.

(Continued)

*Primary Examiner*—Kim Vu
*Assistant Examiner*—Yin-Chen Shaw
(74) *Attorney, Agent, or Firm*—Lerner, David, Littenberg, Krumholz & Mentlik, LLP

(57) ABSTRACT

An information processing device, information processing method and a recording medium are provided. Storage included in the information processing device is operable to store a node key and a leaf key, the leaf key being unique to the information processing device and the node key being unique to each node of a hierarchical network of nodes having a hierarchical tree structure. A decryption processor performs decryption processing to detect whether an encrypted decryption key for decrypting encrypted data is stored in at least one of on the information processing device or on a recording medium. When the encrypted decryption key is detected, the decryption processor is operable to calculate the decryption key by decrypting the encrypted decryption key. However, when the encrypted decryption key is not detected, the decryption processor is operable to calculate the decryption key by decrypting a key block using one of the one or more node keys stored in the storage and the leaf key stored in the storage. The calculated decryption key may then be encrypted and stored by the decryption processor on at least one of the recording medium or the memory.

2 Claims, 29 Drawing Sheets

U.S. PATENT DOCUMENTS

| | | | |
|---|---|---|---|
| 5,150,409 A | | 9/1992 | Elsner |
| 6,049,878 A | | 4/2000 | Caronni et al. |
| 6,069,957 A | * | 5/2000 | Richards ............... 380/281 |
| 6,118,873 A | * | 9/2000 | Lotspiech et al. .......... 380/277 |
| 6,222,923 B1 | | 4/2001 | Schwenk |
| 6,240,188 B1 | * | 5/2001 | Dondeti et al. ............ 380/284 |
| 6,263,435 B1 | * | 7/2001 | Dondeti et al. ............ 713/163 |
| 6,289,102 B1 | * | 9/2001 | Ueda et al. ............... 380/201 |
| 6,359,986 B1 | * | 3/2002 | Tatebayashi ............... 380/277 |
| 6,687,683 B1 | * | 2/2004 | Harada et al. ............... 705/51 |
| 6,880,081 B1 | * | 4/2005 | Itkis ............... 713/163 |
| 6,959,086 B2 | * | 10/2005 | Ober et al. ............... 380/30 |
| 2002/0076204 A1 | * | 6/2002 | Nakano et al. ............... 386/94 |
| 2004/0101138 A1 | * | 5/2004 | Revital et al. ............ 380/210 |

FOREIGN PATENT DOCUMENTS

| | | |
|---|---|---|
| DE | 196 49 292 A1 | 6/1998 |
| EP | 969667 A2 | 1/2000 |
| JP | 9-115241 A1 | 5/1997 |
| JP | 11-187013 A1 | 7/1999 |
| JP | 11-224461 | 8/1999 |
| JP | 11-328850 A1 | 11/1999 |

OTHER PUBLICATIONS

Waldvogel, M. et al., "The VersaKey Framework: Versatile Group Key Management", IEEE Journal on Selected Areas in Communications, Sep. 1999, vol. 17, No. 9, pp. 1614-1631.

Supervised by Shin ICHIMATSU, "Data Hogo to Angou-ka no Kenkyu; Computer Network no Anzensei", Nippon Keizai Shinbunsha, Jul. 29, 1983, pp. 201-206.

Wong, C. K. et al., "Secure Group Communications Using Key Graphs", In: Proceedings of ACM SIGCOMM'98, (1998), pp. 68-79.

Makoto Tatebayashi et al., "Kiroku Media no Contents Hogo System", 2000 nen Denshi Joho Tsuushin Gakkai Kiso Kyoukai Society Kouen Ronbunshuu, Sep. 7, 2000, pp. 367-368.

\* cited by examiner

KRB : Key Renewal Block INSTANCE 1
SEND ROOT KEY K(t)R AT TIME t TO DEVICES 0, 1, 2

| GENERATION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.5A

KRB : Key Renewal Block INSTANCE 2
SEND ROOT KEY K(t)R AT TIME t TO DEVICES 0, 1, 2

| GENERATION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.5B

INSTANCE 1
INSTANCE OF GENERATING
DISC NATIVE KEY
INPUT
MEDIUM KEY (64bits)
DISC ID (64bits)
OUTPUT
DISC NATIVE KEY (64bits)
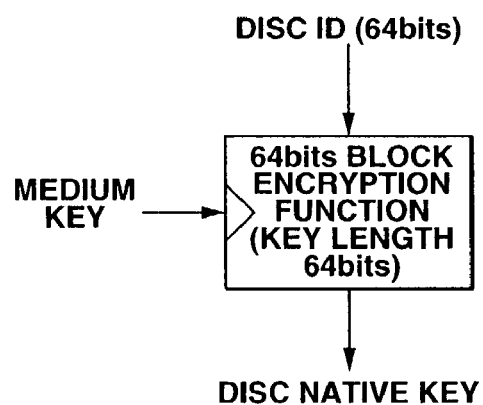
INSTANCE 2
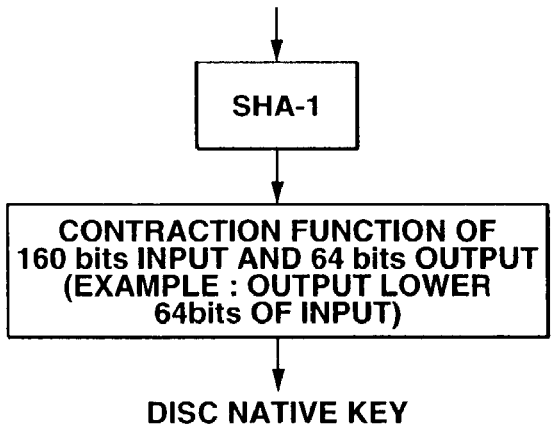
FIG.8

INSTANCE 1

INSTANCE OF GENERATING OF BLOCK KEY

INPUT
BLOCK SEED (32bits)
TITLE NATIVE KEY (64bits)

OUTPUT
BLOCK KEY (64bits)

BLOCK SEED||CONSTANT (32bits)
↓
TITLE NATIVE KEY → 64bits BLOCK ENCRYPTION FUNCTION (KEY LENGTH 64bits)
↓
BLOCK KEY

INSTANCE 2

TITLE NATIVE KEY||BLOCK SEED
↓
SHA-1
↓
CONTRACTION FUNCTION OF 160 bits INPUT AND 64 bits OUTPUT (EXAMPLE : OUTPUT LOWER 64 bits OF INPUT)
↓
BLOCK KEY

FIG.10

KRB : Key Renewal Block INSTANCE 1
SEND ROOT KEY K(t)R AT TIME t TO DEVICES 0, 1, 2

| GENERATION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.19A

KRB : Key Renewal Block INSTANCE 2
SEND ROOT KEY K(t)R AT TIME t TO DEVICES 0, 1, 2

| GENERATION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.19B

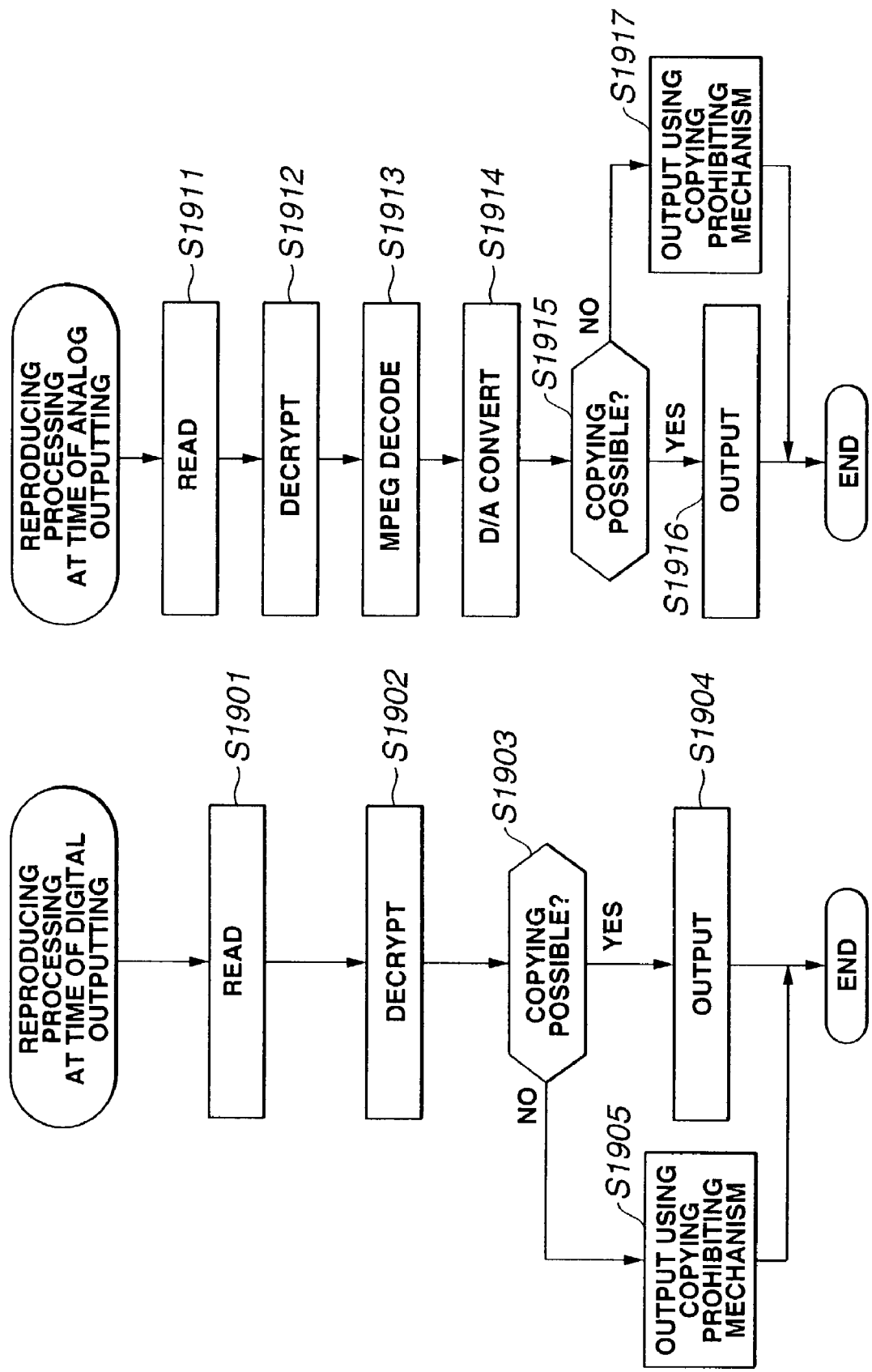

INFORMATION PROCESSING DEVICE AND METHOD

BACKGROUND OF THE INVENTION

This invention relates to an information processing method, an information processing device, an information recording medium and a computer program. More particularly, it relates to an information processing method, an information processing device, an information recording medium and a computer program, which are configured so that keys necessary for recording and/or reproducing content data, such as a master key, a media key or a content key, are distributed or acquired, using a hierarchical key distribution system of a tree structure, and in which respective devices record or reproduce the content data using these keys.

In keeping up with progress and development of digital signal processing techniques, recording devices or recording media for digitally recording the information, are finding widespread use. With the digital recording device or recording medium, since copying can be repeatedly made without degrading the sound or picture quality, recording media obtained on unauthorized duplication may be circulated on the market, thus impairing the benefit of the copyright owners or authorized distributors of various contents, such as music or motion pictures. Nowadays, various techniques or systems for preventing unauthorized duplication have been introduced in the digital recording devices or digital recording media in order to prohibit such unauthorized duplication of digital data.

For example, in a MD (mini-disc), mini-disc and MD being registered trademarks of Sony Corporation, an SCMS (Serial Copy Management System) is used as a method of prohibiting unauthorized duplication. The SCMS is such a system in which, on the data reproducing side, an SCMS signal is output along with audio data from a digital interface (DIF) and, on the receiving side, the recording of audio data from the reproducing side is controlled based on the SCMS signal from the reproducing side to prohibit the unauthorized duplication.

Specifically, the SCMS signal is such a signal indicating whether given audio data is copy-free data, for which copying can be made any number of times, copy-once-allowed data, for which copying is allowed once, or copy-prohibited data, for which copying is prohibited. On receipt of audio data from the DIF, the data recording side detects the SCMS signal, sent along with the audio data. If the SCMS signal is copy-free, the audio data is recorded, along with the SCMS signals, on a minidisc. If the SCMS signal is copy-once-allowed, the SCMS signal is changed to copy-prohibited and is recorded along with the audio data on the mini-disc. If the SCMS signal is copy-prohibited, audio data is not recorded. By this control employing the SCMS, unauthorized duplication of audio data, protected by copyright, may be prevented from occurring.

However, with the SCMS, it is unnecessary for the data recording equipment itself to incorporate means for controlling the recording of the audio data based on the SCMS signals, as described above. Thus, a mini-disc type recorder that is not capable of executing SCMS control will be unable to prevent illicit copying. In view of such limitation, the digital video disc (DVD) player, for example, is configured for prohibiting illicit copying of copyright-protected data by exploiting a content scramble system.

In the content scramble system, video or audio data are recorded encrypted in a DVD-ROM (Read Only Memory), and a key used for decoding the encrypted data (decrypting key) is provided to each licensed DVD player. Only DVD players which are designed to comply with preset operational regulations, such as not undertaking illicit copying, are licensed. In such way, the licensed DVD player is able to reproduce the pictures or speech recorded on the DVD-ROM by decoding the encrypted data through use of the key.

On the other hand, an unlicensed DVD player, not having a key for decoding the encrypted data, is unable to decode the encrypted data recorded on the DVD-ROM. Thus, with the content scramble system configuration, a DVD player not meeting required conditions to be accorded the license cannot reproduce the DVD-ROM having digital data recorded thereon. In such way, unauthorized duplication is prevented.

However, the content scramble system, used in the DVD-ROM, is designed for a recording medium on which data writing by the user is impossible (this sort of the recording medium is incidentally referred to below as ROM media), while no provision is made for a recording medium on which data writing by the user is possible (this sort of the recording medium is incidentally referred to below as RAM (random access memory) media).

Thus, even if the data recorded on the ROM-media is encrypted, but the encrypted data is copied in its entirety onto the RAM media, the result is a so-called pirated edition which reproducible on a licensed authorized device.

The present Assignee proposed in our senior patent application (Japanese Laying-Open Patent Publication H-11-224461; JP Patent Application 10-25310) a configuration in which the information for identification of individual recording media, referred to below as medium identification information, is recorded along with other data on a recording medium in question to permit only the licensed authentic device to access the medium identification information of the recording medium.

With this method, data on the recording medium is encrypted by the media identification information and a secret key (master key), obtained on licensing, such that, if an unlicensed device or equipment reads out the encrypted data, no meaningful data can be produced. It is noted that the device has its operation regulated at the time of licensing so that illicit duplication (unauthorized copying) is prohibited.

An unlicensed device cannot access the media identification information, while the medium identification information is of a value specific to each medium, so that, if such unlicensed device duplicates the totality of the encrypted data, recorded on the recording medium, on a new recording medium, the data recorded on the so produced recording medium cannot be decrypted correctly on a licensed device, to say nothing of the unlicensed device, thus effectively prohibiting the unauthorized duplication.

Meanwhile, in the above configuration, a master key stored in a licensed device or equipment is usually common to all devices or equipment. The reason a common master key is stored in all the equipment is that this represents an essential condition in order to make the media recorded on a given equipment reproducible on other equipment, that is to assure interoperability.

If, in such system, a hacker succeeds in obtaining the master key from one of the licensed pieces of equipment and distributes the master key, the encrypted recorded data can be decrypted by all pieces of equipment in the entire system, thus leading to breakdown of the entire system. In order to prevent this from occurring, it is essential that, if it is revealed that a given equipment has been attacked and a master key has become known, the master key be changed to a new one, which then is given to all pieces of the equipment except the equipment which has succumbed to the attack. As the simplest system to realize this configuration, a key unique to each equipment (device key) may be given to each equipment and a value obtained on encrypting the new master key with the individual device key may then be formed and transmitted to each equipment through a recording medium. However, in this case, the volume of the entire messages to be transmitted is undesirably increased in proportion to the number of the pieces of equipment.

As the configuration which possibly overcomes such problem, the present Assignee has already proposed in commonly owned co-pending patent application (JP Patent Application 2000-105328) a configuration employing a key distribution method having respective information recording and/or reproducing devices arranged at respective leaves of an n-branched tree, in which a key necessary for recording the content data on a recording medium or reproduction from the recording medium (master key or media key) is distributed through a recording medium or over a communication network. Each equipment then undertakes recording or reproduction of the content data using the so distributed master key or media key to enable the key to be distributed to authorized equipment (equipment in which secrecy is not disclosed), such that a lesser message volume is needed. Specifically, a key needed to generate a key required for recording on a recording medium or reproduction from the recording medium is set as a renewal node key. Such node key is allocated to each leaf or node of a n-branched tree. The renewal node key is encrypted such that decryption is possible only with a leaf key or a node key owned by the authorized equipment, and the resulting encrypted information is included in a key renewal block (KRB) which is then distributed to each information recording and/or reproducing piece of equipment. On receipt of the key renewal block (KRB), each recording and/or reproducing piece of equipment executes KRB decrypting processing to acquire the key necessary for recording or reproduction on or from the recording medium.

When the key distributing method is used in which the information recording and/or reproducing equipment pieces are arranged at the respective leaves of a n-branched tree and when media keys allocated to respective recording media are encrypted with the key renewal block (KRB) and distributed in this form, each recording and/or reproducing equipment has to carry out media key calculations. This must be done using the key renewal block (KRB) and the device key each time the recording media are accessed. Since the volume of these calculations is proportionate to the product of the time needed to decrypt the individual encrypted messages and the tree depth up to the leaves corresponding to the recording and/or reproducing equipment, the processing overhead is increased in the case of a large-sized system having a large number of the devices.

Commonly owned Japanese Patent Application 2000-105329 discloses a configuration employing a key distribution method having respective recording and/or reproducing equipment arranged at respective leaves of an n-branched tree, in which a content key is furnished through a recoding medium over a communication network as a cipher key necessary to record and/or reproduce the content data from the recording medium. This configuration is one in which the content data and a content key corresponding to the encrypted content data are sent e.g., over a communication network, with the content key being sent as encrypted data.

The encrypted content key is furnished using a key renewal block (KRB) obtained on encrypting a node key allocated to a node at each leaf of a n-branched tree set as a renewal node key. The renewal node key can then be decrypted with a leaf key or a node key owned solely by an authorized equipment. By furnishing the content key encrypted by the renewal node key, only the authorized recording and/or reproducing device is able to acquire the content key.

If the encrypted content key is furnished using the key distribution method having the information recording and/or reproducing devices arranged at the respective leaves of the n-branched tree, each recording and/or reproducing device has to process the KRB with the device key (leaf key) to calculate the content key. This is performed each time the content is used. For example, it is performed each time the content is reproduced from the recording medium.

Since the volume of these calculations is proportionate to the product of the time needed to decrypt the individual encrypted messages and the depth of the tree to the leaves of the tree which correspond to the recording and/or reproducing equipment, the processing overhead is increased in the case of a large-sized system having a large number of the recording and/or reproducing devices.

SUMMARY OF THE INVENTION

For overcoming the above-mentioned problem, the present invention is aimed to provide a configuration employing a key distributing method including recording and/or reproducing equipment arranged at respective leaves of an n-branched tree, in which the processing of calculating the encrypted key or decrypting key based on the key renewal block (KRB) is omitted to enable the encrypted key or the decrypting key to be acquired in a short time. More specifically, the present invention is aimed to provide an information processing method, an information processing device, an information recording medium and a computer program, in which, after acquiring a media key of a recording medium on calculations, a given recording and/or reproducing device encrypts the so acquired media key using a cipher key unique to the recording and/or reproducing device, and stores the so encrypted media key, so that, when the recording medium is used next time, the media key can be calculated on decrypting the cryptotext only once, thereby enabling the content key as the encrypted key or the decrypting key to be acquired in a short time.

The present invention is also aimed to provide a configuration of providing a content key as an encrypted key or the decrypting key employing a key distributing method including recording and/or reproducing equipment arranged at respective leaves of an n-branched tree, in which the processing of calculating the encrypted key or decrypting key based on the key renewal block (KRB) is omitted to enable the content key as the encrypted key or the decrypting key to be acquired in a short time. More specifically, the present invention is aimed to provide an information processing method, an information processing device, an information recording medium and a computer program, in which, after acquiring a content key for content stored in a recording medium on calculations, a given recording and/or reproducing device encrypts the so acquired content key using a cipher key unique to the recording and/or reproducing device, and stores the so encrypted content key, so that, when the recording medium is used next time, the content key can be calculated on decrypting the cryptotext only once, thereby enabling the content key as the encrypted key or the decrypting key to be acquired in a short time.

The present invention provides an information processing device for processing encrypted data, including storage means for holding a node key unique to each of a plurality of nodes forming a hierarchical tree structure having a plurality of such information processing devices, operating as leaves, and a leaf key unique to each of the information processing devices, and encryption processing means for executing encryption processing. The encryption processing means executes decryption processing of decrypting a key block formed as key storage data that can be decrypted using at least one of the node key and the leaf key held by the storage means to effect calculation processing of calculating a decrypting key used in decrypting the encrypted data. The encryption processing means also effects encrypting processing for encrypting the calculated decrypting key using a key unique to the processing device to store the encrypted decrypting key on a recording medium or in a storage area in the information processing device.

The present invention also provides an information processing device for processing encrypted data, including storage means for holding a node key unique to each of a plurality of nodes forming a hierarchical tree structure having a plurality of such information processing devices, operating as leaves, and a leaf key unique to each of the information processing devices, and encryption processing means for executing encryption processing. The encryption processing means executes decryption processing of decrypting a key block formed as key storage data that can be decrypted using at least one of the node key and the leaf key held by the storage means to effect calculation processing of calculating a decrypting key used in decrypting the encrypted data. The encryption processing means stores the calculated decrypting key in a storage area in the information processing device in association with a generation number as the renewal information for the decrypting key.

The present invention also provides an information processing device for processing encrypted data, including storage means for holding a node key unique to each of a plurality of nodes forming a hierarchical tree structure having a plurality of such information processing devices, operating as leaves, and a leaf key unique to each of the information processing devices, and encryption processing means for executing encryption processing. The encryption processing means executes decryption processing of decrypting a key block formed as key storage data that can be decrypted using at least one of the node key and the leaf key held by the storage means to effect calculation processing of calculating a decrypting key used in decrypting the encrypted data. The encryption processing means stores the calculated decrypting key in a storage area in the information processing device in association with the identification information used for discriminating the data decrypted using the decrypting key.

The present invention also provides an information processing device for processing encrypted data, including storage means for holding a node key unique to each of a plurality of nodes forming a hierarchical tree structure having a plurality of such information processing devices, operating as leaves, and a leaf key unique to each of the information processing devices, and decrypting processing means for executing decrypting processing. The decrypting processing means reads in a table stored in a recording area on a recording medium or in the information processing device to retrieve whether or not a decrypting key used for decrypting the encrypted data is stored therein. The decrypting processing means effects decrypting processing of the encrypted decrypting key stored on the recording medium or in the recording area in the information processing device in case of detection of the decrypting key to calculate the decrypting key used for decrypting the encrypted data. The decrypting processing means effects decrypting processing of a key block formed by decryptable key storage data, in case of failure in detecting the decrypting key, using at least one of the node key and the leaf key held by the storage means, to calculate the decrypting key used in decrypting the encrypted data.

The present invention also provides an information processing method used in a plural number of information processing devices for processing encrypted data, there being a node key unique to each node having a hierarchical tree structure having a plural number of such information processing devices operating as leaves and a leaf key unique to each information processing device. The present method decrypts a key block formed by key storage data decryptable using at least the node key or the leaf key held by each of the information processing devices to calculate the decrypting key used in decrypting the encrypted data to encrypt the so calculated decrypting key using the key unique to each information processing device to store the encrypted decrypting key in a recording medium or in a recording area in the information processing device.

The present invention also provides an information processing method used in a plural number of information processing devices for processing encrypted data, there being a node key unique to each of a plurality of nodes forming a hierarchical tree structure having a plurality of such information processing devices operating as leaves, and a leaf key unique to each of the information processing devices, in which the method includes decrypting a key block formed as key storage data that can be decrypted using at least one of the node key and the leaf key held by the information processing device, calculating a decrypting key used for decrypting encrypted data and storing the calculated decrypting key in a storage area in the information processing device in association with a generation number as the renewal information of the decrypting key.

The present invention also provides an information processing method used in a plural number of information processing devices for processing encrypted data, there being a node key unique to each of a plurality of nodes forming a hierarchical tree structure having a plurality of such information processing devices operating as leaves, and a leaf key unique to each of the information processing devices, in which the method includes decrypting a key block formed as key storage data that can be decrypted using at least one of the node key and the leaf key held by the information processing device, calculating a decrypting key used for decrypting encrypted data, and storing the calculated decrypting key in a storage area in the information processing device in association with the identification information for discriminating the data decrypted using the decrypting key.

The present invention also provides an information processing method used in a plural number of information processing devices for processing encrypted data, there being a node key unique to each of a plurality of nodes forming a hierarchical tree structure having a plurality of such information processing devices as leaves, and a leaf key unique to each of the information processing devices, in which the method includes reading in a table stored on a recording medium or in a storage area in an information processing device, retrieving whether or not there is stored a decrypting key used in decrypting the encrypted data and decrypting the encrypted decrypting key stored on the recording medium or in the recording area in the information processing device, in case the decrypting key has been detected, to calculate a decrypting key used in decrypting the encrypted data, and decrypting, in case of failure in detecting the decrypting key, a key block formed by key storage data, decryptable using at least one of the node key and the leaf key held by the information processing device, to calculate the decrypting key used in decrypting the encrypted data.

The present invention also provides a computer program executed on a plural number of information processing devices for processing encrypted data, there being a node key unique to each of a plurality of nodes forming a hierarchical tree structure having a plurality of such information processing devices operating as leaves, and a leaf key unique to each of the information processing devices, in which the computer program includes decrypting a key block formed as key storage data that can be decrypted using at least one of the node key and the leaf key held by the storage means, calculating a decrypting key used in decrypting the encrypted data, encrypting the calculated decrypting key using a key unique to the processing device, and storing the encrypted decrypting key on a recording medium or in a storage area in the information processing device.

The present invention also provides a computer program executed on a plural number of information processing devices for processing encrypted data, there being a node key unique to each of a plurality of nodes forming a hierarchical tree structure having a plurality of such information processing devices operating as leaves, and a leaf key unique to each of the information processing devices, in which the program includes decrypting a key block formed as key storage data that can be decrypted using at least one of the node key and the leaf key held by the information processing device, calculating a decrypting key used for decrypting encrypted data and storing the calculated decrypting key in a storage area in the information processing device in association with a generation number as the renewal information of the decrypting key.

The present invention also provides a computer program executed on a plural number of information processing devices for processing encrypted data, there being a node key unique to each of a plurality of nodes forming a hierarchical tree structure having a plurality of such information processing devices operating as leaves, and a leaf key unique to each of the information processing devices, in which the computer program includes decrypting a key block formed as key storage data that can be decrypted using at least one of the node key and the leaf key held by the information processing device, calculating a decrypting key used for decrypting encrypted data, and storing the calculated decrypting key in a storage area in the information processing device in association with the identification information for discriminating the data decrypted using the decrypting key.

The present invention also provides a computer program executed on a plural number of information processing devices for processing encrypted data, there being a holding a node key unique to each of a plurality of nodes forming a hierarchical tree structure having a plurality of such information processing devices, operating as leaves, and a leaf key unique to each of the information processing devices, in which the computer program includes reading in a table stored on a recording medium or in a storage area in an information processing device, retrieving whether or not there 15 stored a decrypting key used in decrypting the encrypted data, decrypting the encrypted decrypting key stored on the recording medium or in the recording area in the information processing device, in case the decrypting key has been detected, to calculate a decrypting key used in decrypting the encrypted data, and decrypting, in case of failure in detecting the decrypting key, a key block formed by key storage data decryptable using at least one of the node key and the leaf key held by the information processing device, to calculate the decrypting key used in decrypting the encrypted data.

The present invention also provides an information recording medium in which the recorded information can be read out by a plural number of information processing devices wherein a decrypting key, that is a key used for decrypting the encrypted data, is recorded as a key storage table in association with the identification information of the information processing device.

In the configuration of the present invention, the volume of distributed messages required for key renewal is suppressed by employing the hierarchical key distribution system of a tree structure. That is, the key distribution method of a configuration having respective equipment arranged at respective leaves of a n-branched tree is used. The keys necessary for recording content data on a recording medium or reproducing data from the recording medium (master key, media keys or content keys) are distributed via recording medium or over a communication network. Using these keys, the respective devices record or reproduce content data. By the key distribution system of the tree structure, the media key to be renewed is transmitted along with the key renewal block (KRB), with the recording and/or reproducing device then calculating and acquiring the media key of the recording medium based on the received KRB to encrypt the acquired media key using a cipher key unique to the recording and/or reproducing device, such as a leaf key, to store the encrypted leaf key for storage in the recording medium or in the memory of the recording and/or reproducing device. Thus, when the recording medium is to be used next time, the recording and/or reproducing device is able to calculate the media key on decrypting the encrypted key only once to decrease the volume of the processing operations, such as KRB decrypting processing as needed for the recording and/or reproducing device to access the recording medium.

Similarly, by the key distributing configuration of the tree structure, the content key for encrypting the content is transmitted along with the key renewal block (KRB), with the recording and/or reproducing device then acquiring the content key based on the received KRB and encrypting the cipher key unique to the recording and/or reproducing device, such as a leaf key, to store the resulting encrypted key on a recording medium or in a memory of the recording and/or reproducing device. So, when the recording and/or reproducing device next reproduces and exploits the content, the content key can be calculated on decrypting the encrypted content key only once, thus eliminating the necessity for the recording and/or reproducing device to execute KRB decrypting processing each time the content is used.

Meanwhile, the program furnishing medium according to the present invention is a medium for furnishing a computer program, in a computer readable form, to a general-purpose computer system capable of executing a variety of program codes. There is no particular limitation to the configuration of the media, including recording media, such as CD, FD or MO, or to the transmission medium, such as networks.

The program furnishing medium gives a definition of the relationship as to structural or functional cooperation between the computer program and the furnishing medium in implementing the functions of the preset computer program on a computer system. Stated differently, by installing the computer program on the computer system through the furnishing medium, cooperative actions can be realized on the computer system to realize the operations and effect similar to the other aspects of the present invention.

Other objects, features and advantages of the present invention will become more apparent from reading the embodiments of the present invention with reference to the drawings.

BRIEF DESCRIPTION OF THE DRAWINGS

FIGS. 5A and 5B show an instance of a key renewal block (KRB) used for distributing media keys to the recording and/or reproducing device according to the present invention.

FIG. 8 illustrates the generation of a key unique to a disc, usable in the information recording and/or reproducing device according to the present invention.

FIG. 10 shows an instance of generating and a block key, usable in the information recording and/or reproducing device according to the present invention.

FIGS. 19A and 19B show an instance of a key renewal block (KRB) used in distributing a key, such as content key, for the information recording and/or reproducing device according to the present invention.

FIGS. 28A and 28B are flowcharts for illustrating the copying controlling processing in data reproduction processing in the information recording and/or reproducing device according to the present invention.

BEST MODE FOR CARRYING OUT THE INVENTION DETAILED DESCRIPTION

Figure 1:
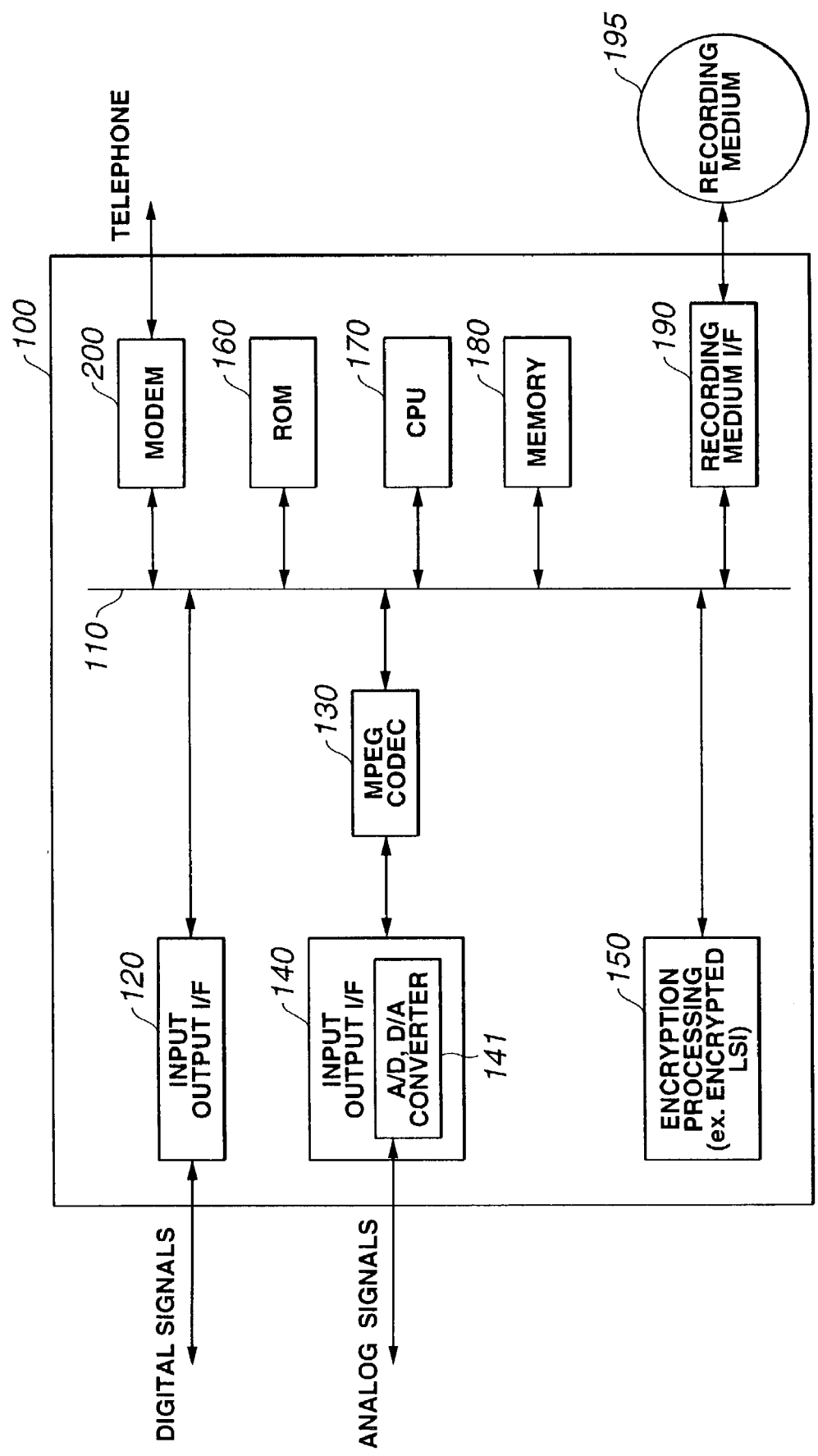
FIG. 1 is a block diagram showing an illustrative structure of an information recording and/or reproducing device of the present invention.

FIG. 1 is a block diagram showing the structure of an embodiment of a recording and/or reproducing device 100 according to the present invention. The recording and/or reproducing device 100 includes an input/output I/F (interface) 120, an MPEG (Moving Picture Experts Group) codec 130, an input/output I/F (interface) 140 including an analog to digital (A/D) and a digital to analog (D/A) converter 141, encryption processing means 150, a ROM (read-only memory) 160, a CPU (central processing unit) 170, a memory 180 and a recording medium interface (I/F) 190 for a recording medium 195. These units are interconnected over a bus 110.

The input/output I/F 120 receives digital signals forming various content, such as pictures, speech or programs, supplied from outside the device 100, to output the received signals over the bus 110. The input/output I/F 120 also receives digital signals over the bus 110 to output the signals to outside of the device 100. The MPEG codec 130 decodes the MPEG-encoded data, supplied over the bus 110, to output the decoded data to the input/output I/F 140. The MPEG codec 130 also encodes digital signals supplied from the input/output I/F 140 to output MPEG encoded signals over the bus 110. The input/output I/F 140 receives analog signals, as content, supplied from outside, and performs analog to digital conversion of the received analog signals into digital signals, and outputs them to the MPEG codec 130. The input/output I/F 140 also performs digital to analog conversion of the digital signals received from the MPEG codec 130 into analog signals using the A/D-D/A converter 141. The analog signals are then output to outside.

The encryption processing means 150 is formed by, for example, a one-chip LSI (large scale integrated circuit). The encryption processing means encrypts or decrypts the digital signals, as content, supplied over the bus 110, to output the resulting data again over the bus 110. Meanwhile, the encryption processing means 150 is not limited to a one-chip LSI but may also be formed by various software and hardware combined together. The configuration as processing means by the software configuration will be explained subsequently.

The ROM 160 stores a leaf key, as a device key owned either by each individual recording and/or reproducing device or by each of groups of recording and/or reproducing devices. The ROM also stores a node-key as a device key co-owned by individual recording and/or reproducing devices or by plural groups of recording and/or reproducing devices. The CPU 170 executes programs stored in a memory 180 to control the MPEG codec 130 and the encryption processing means 150, for example. The memory 180 is e.g., a non-volatile memory for storing programs run by the CPU 170 or for storing data required for operation of the CPU 170. The recording medium I/F (interface) 190 drives a recording medium 195 capable of recording and/or reproducing digital data to read out or reproduce digital data from the recording medium 195. The read-out digital data is outputted over the bus 110. The recording medium interface 190 also furnishes the digital data, provided over the bus 110, to the recording medium 195 for recording thereon. Meanwhile, the program and the device key may also be stored in the ROM 160 and in the memory 180, respectively.

A modem 200 connects to an external device over a telephone network. For example, the modem 200 connects to a server, such as Internet service provider (ISP) for establishing a communication path with content distribution servers on the Internet.

The recording medium 195 is a medium capable of storing digital data, including optical discs, such as DVD or compact disc (CD), magneto-optical disc, magnetic disc, magnetic tape or a semiconductor memory, such as RAM. In the present embodiment, the recording medium 195 is removable with respect to the recording medium interface 190. The recording medium 195 may also be enclosed in the recording and/or reproducing device 100.

Referring to the flowcharts of FIGS. 2A, 2B, 3A and 3B, the data recording processing on the recording medium and the data reproducing processing from the recording medium, in the recording and/or reproducing device of FIG. 1, are hereinafter explained. In recording the content of digital signals from outside the device onto the recording medium 195, the recording processing is performed in accordance with the flowchart of FIG. 2A. That is, when the content of digital signals (digital content) are sent, e.g., over an IEEE (Institute of Electrical and Electronics Engineers) 1394 serial bus to the input/output I/F 120, the input/output I/F 120 at step S201 receives the digital content, supplied thereto, to output the received digital content over the bus 110 to the encryption processing means 150.

The encryption processing means 150 at step S202 executes the encryption processing on the digital content received to output the resulting encrypted content over the bus 110 to the recording medium interface 190. The encrypted content is recorded via recording medium interface 190 on the recording medium 195 (S203) to terminate the recording processing.

As the standard for protection of digital content in case of transmitting the digital content between equipment interconnected over an IEEE 1394 serial bus, 5CDTCP (Five Company Digital Transmission Content Protection), incidentally referred to as DTCP, is provided by five companies including the present Assignee SONY Corporation. In this DTCP, when non-copy-free digital content is transmitted between different devices, reciprocal authentication is performed prior to data transmission to check whether or not the copy control information can be handled correctly. If the copy control information can be handled correctly, the transmission side encrypts the digital content and sends the encrypted content, with the receiving side then decrypting the encrypted digital content (encrypted content).

In data transmission and reception, based on the DTCP standard, the input/output I/F 120 on the data receipt side at step S201 receives the encrypted content over the IEEE 1394 serial bus to decrypt the encrypted content in accordance with the DTCP to output the resulting plaintext content subsequently to the encryption processing means 150.

The encryption of the digital content by DTCP is executed by generating a key changing with time and by employing the generated key. The encrypted digital content, inclusive of the key used for encryption, is transmitted over the IEEE 1394 serial bus. The receipt side decrypts the encrypted digital content, using the key contained therein.

More correctly, according to DTCP, an initial value of the key and a flag indicating the change timing of the key used in encrypting the digital content is included in the encrypted content. The receipt side modifies the initial value of the key contained in the encrypted content with a timing of a flag similarly contained in the encrypted content to generate a key used to decrypt the encrypted content. However, this may be thought to be equivalent to the encrypted content containing a key for decryption. Therefore, in the following, this understanding is used. It should be noted that an information version of the DTCP standard can be acquired by any person from the DTLA (Digital Transmission Licensing Administrator).

The processing of recording the content of analog signals arriving from outside the device 100 onto the recording medium 195 is now explained with reference to the flowchart of FIG. 2B. When the content of the analog signals (analog content) is sent to the input/output I/F 140, the input/output I/F 140 at step S221 receives the analog content. The input/output I/F 140 then proceeds to S222 to A/D convert the analog content using the included A/D-D/A converter 141 into the form of digital signals (digital content).

The digital content is sent to the MPEG codec 130. At step S223, the digital content is MPEG encoded, that is encoded using MPEG compression. The resulting encoded data is sent over the bus 110 to the encryption processing means 150.

Figure 2A:
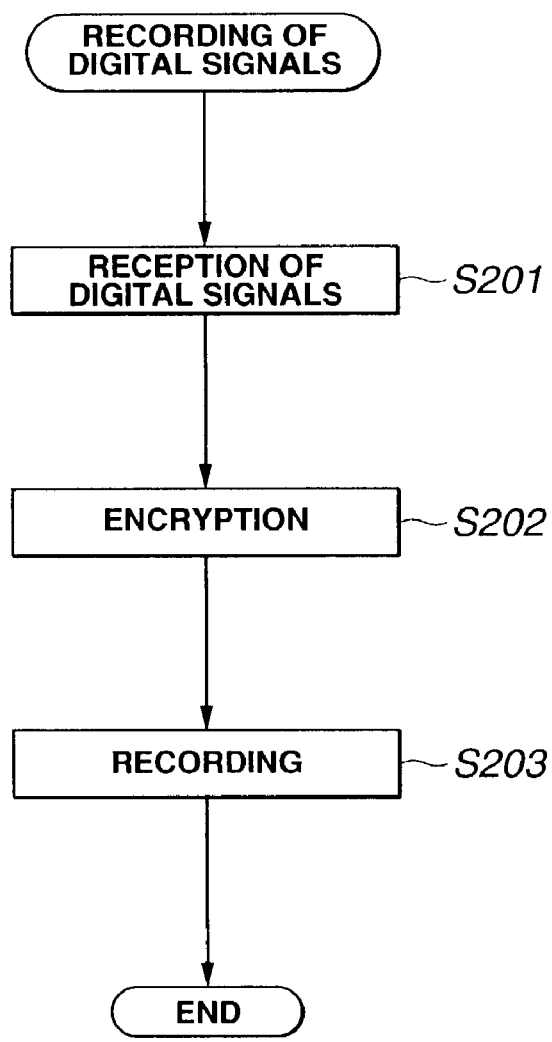
FIGS. 2A and 2B show data recording processing flow of the information recording and/or reproducing device of the present invention.
Figure 2B:
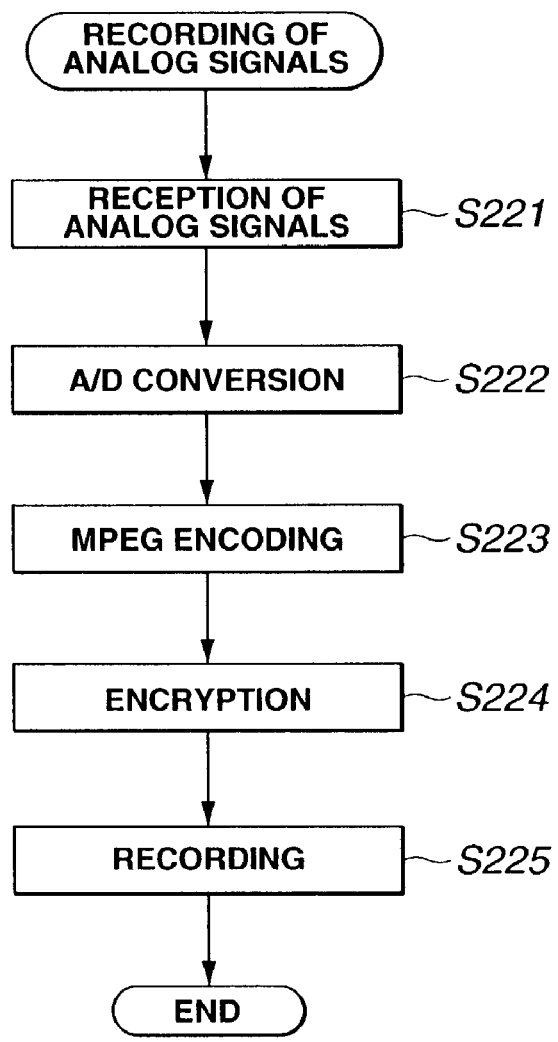

Subsequently, at steps S224 and S225, the processing similar to that performed at steps S202 and S203 of FIG. 2A is performed. That is, the encryption processing by the encryption processing means 150 is executed and the resulting encrypted content is recorded on the recording medium 195. The recording processing is then terminated.

Figure 3A:
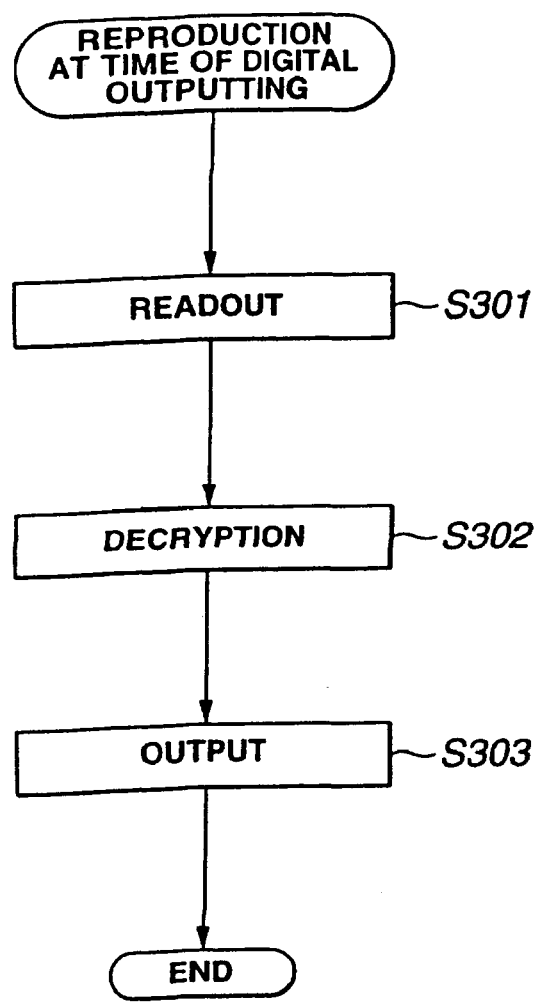
FIGS. 3A and 3B show data reproduction processing flow of the information recording and/or reproducing device of the present invention.

The processing of reproducing the content recorded on the recording medium 195 and outputting the reproduced content as digital or analog content is explained with reference to the flowcharts of FIGS. 3A and 3B. The processing of outputting the content as digital content to outside is executed as the reproduction processing conforming to the flowchart of FIG. 3A. That is, first, at step S301, the encrypted content, recorded on the recording medium 195, is read out by the recording medium interface 190, and output over the bus 110 to the encryption processing means 150.

At step S302, the encryption processing means 150 decrypts the encrypted content, supplied from the recording medium interface 190, and the resulting decrypted data is sent over the bus 110 to the input/output I/F 120. At step S303, the input/output I/F 120 outputs the digital content to outside to terminate the reproduction processing.

In outputting the digital content over the IEEE 1394 serial bus, the input/output I/F 120 at step 5303 undertakes authentication with a counterpart device, in accordance with the DTCP standard, as described above. The input/output I/F 120 then encrypts and transmits the digital content.

Figure 3B:
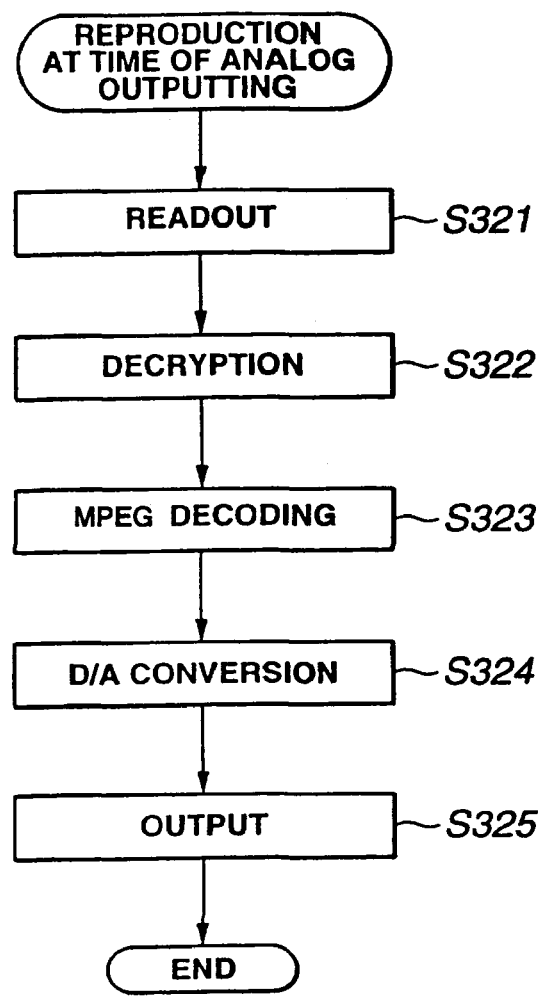

In reproducing the content recorded on the recording medium 195 and outputting the reproduced content as analog data to outside, the reproducing processing is executed in accordance with the flowchart of FIG. 3B.

That is, at steps S321 and S322, the processing similar to that in steps S301 and S302 is carried out, whereby the decrypted digital content, obtained by the encryption processing means 150, is sent over the bus 110 to the MPEG codec 130.

The MPEG codec 130 at step S323 MPEG decodes, that is expands, the digital content, to output the expanded content to the input/output I/F 140. The input/output I/F 140 at step S324 D/A converts the digital content, MPEG decoded by the MPEG codec 130, using the included A/D-D/A converter 141, to form analog content. The MPEG codec then proceeds to step S325 where the input/output I/F 140 outputs the analog content to outside the device 100 to terminate the reproduction processing.

A configuration for distributing keys, for example, a master key or a media key, to respective equipment will now be explained, the keys being necessary for the recording and/or reproducing device of FIG. 1 to record or reproduce data on or from the recording medium. The master key is a common key in the present system, held by all of the recording and reproducing devices in common and recorded in the devices at the time of manufacture. The media key belongs to each recording medium and is recorded in the recording medium at the time that the medium is manufactured. Ideally, the media key differs from one recording medium to another. However, from the constraint associated with the manufacturing process of the recording medium, more realistically, the media key varies from one group of recording media to another. For example, the media key may be changed from one lot corresponding to a production lot of recording media as one group to another. The following description is centered about an instance of renewing these keys. However, the present invention may also be applied for distributing or recording these keys to or on a device not having a master key recorded or on a recording medium on which a media key is not recorded.

Figure 4:
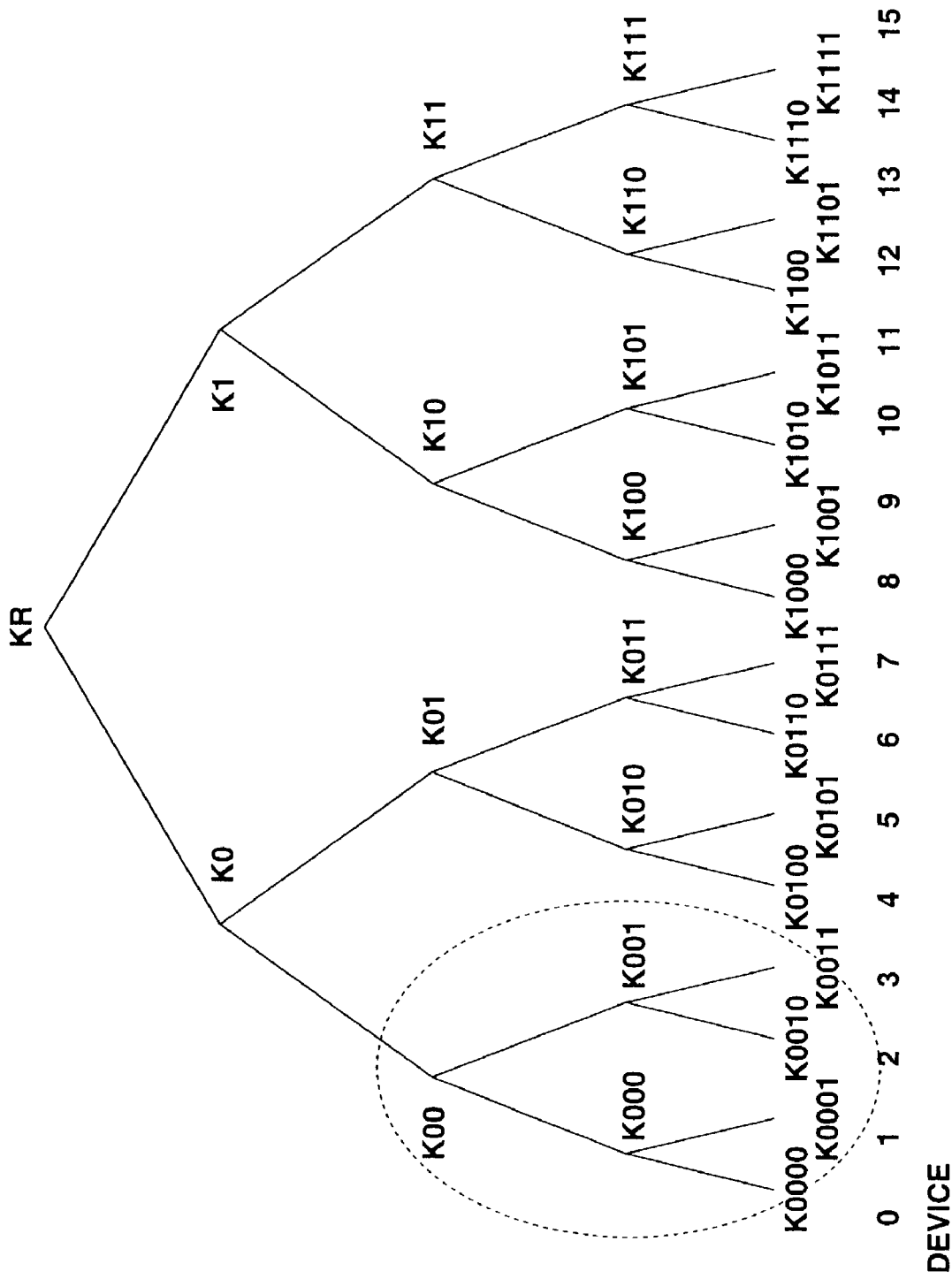
FIG. 4 shows a tree structure for illustrating the encryption processing for a key, such as a media key, for the information recording and/or reproducing device of the present invention.

FIG. 4 shows a key distribution configuration in a recording and/or reproducing device in a recording system employing the present system. The numbers 0 to 15 shown in the bottom row of FIG. 4 indicate respective recording and/or reproducing devices. That is, the recording and/or reproducing devices correspond to the leaves of the tree structure shown in FIG. 4.

The respective devices 0 to 15 at the time of manufacture and shipment include keys (node keys) stored therein, the node keys being assigned to nodes from own leaves to the root in a predetermined initial tree, and leaf keys of the respective keys. Keys K0000 to K1111, shown at the bottom of FIG. 4, represent leaf keys assigned to the respective devices 0 to 15. The top key KR and all the keys between the top key and the leaf keys, i.e. all keys from key KR to the keys K0000 to K111 being node keys.

In the tree structure shown in FIG. 4, the device 0 owns the leaf key K0000 and node keys K000, K00, K0 and KR. The device 5 owns leaf key K0101, and node keys K010, K01, K0 and KR, while the device 15 owns leaf key K1111, and node keys K111, K11, K1 and KR. Although only 16 devices numbered 0 to 15 are indicated in the tree structure of FIG. 4, more devices may be entered in a tree. Moreover, while the tree configuration has a well-balanced left-right symmetrical structure in four rows, the number of rows in the tree structure may differ from that shown therein.

The recording and/or reproducing devices included in the tree structure of FIG. 4, may be of different types employing a variety of recording media, such as DVD, CD, MD or Memory Stick (registered trademark of Sony Corporation). Moreover, it may be assumed that a variety of application services co-exist. The key distribution configuration shown in FIG. 4 is applied to this configuration of co-existing applications.

In a system where different types of devices and applications co-exist, the portion surrounded by a dotted line in FIG. 4, that is devices 0 to 3, is set as a group employing the same recording medium. For the devices belonging to this group indicated by the dotted line, certain processing operations may be performed simultaneously, such as encrypting common content forwarded from a provider, forwarding a master key used in common, or outputting payment data such as a content fee in a similarly encrypted form to a provider or to a settlement organization. The organization responsible for data transmission and reception to or from respective devices, such as the content providers or settlement organizations, processes forwarding data in a lumped form, with the portion surrounded by a dotted line in FIG. 4, that is the devices 0 to 3, as a group. A plurality of such groups exist in the tree structure of FIG. 4.

It should be noted that the node and leaf keys may be supervised in a centralized fashion by a sole key management center, or on the group basis by the providers or settlement organizations transmitting or receiving a variety of data to or from the respective groups. In the event the security of a key is compromised, i.e., the key becomes known, the node or leaf keys are renewed by the key management center, provider or by the settlement organizations.

As may be seen from FIG. 4, the four devices 0 to 3 of one group own common keys K00, K0 and KR as node keys. By exploiting this node key co-owning configuration, it becomes possible to furnish a common master key only to the devices 0 to 3, for example. Thus, if the co-owned node key K00 itself is set as a master key, a common master key can be set only for the devices 0 to 3 without executing new key forwarding operations. Moreover, if a value Enc (K00, Kmaster), obtained on encrypting a new master key Kmaster with the node key K00, is distributed over the network, or as it is stored on a recording medium, only the devices 0 to 3 are able to decrypt the cipher Enc (K00, Kmaster) to obtain the master key Kmaster. Meanwhile, Enc (Ka, Kb) indicate data obtained on encrypting a key Kb with a key Ka.

If it is revealed at a certain time point t that the keys owned by the device 3, that is K0011, K001, K00, K0 and KR have become known, for example, through the efforts of a hacker, the device 3 subsequently needs to be separated from the system in order to protect data transmitted or received in the system, i.e., group of the devices 0 to 3. To this end, the node keys K001, K00, K0 and KR must be renewed to new keys K(t)001, K(t)00, K(t)0 and K(t)R, respectively, while these renewed keys must be transmitted to the devices 0, 1 and 2. Herein, the notation K(t)aaa denotes a renewed key for Kaaa time t.

The processing of distributing a renewal key is now explained. The renewal of a key is executed by storing a table formed by block data known as a key renewal block (KRB) (shown for example in FIG. 5A) in a network or in a recording medium and sending the table to the devices 0 to 2.

The key renewal block (KRB), shown in FIG. 5A, is formed as block data having a data structure in which renewal is possible only for the devices in need of renewal of node keys. The block data shown in FIGS. 5A and 5B are formed with a view to distributing a renewal node key at a time of generation t to the devices 0, 1 and 2 of the tree structure shown in FIG. 4. As may be seen from FIG. 4, the devices 0 and 1 needs of K(t)00, K(t)0 and K(t)R as renewal node keys. On the other hand, device 2 is in need of K(t)001, K(t)00, K(t)0 and K(t)R as renewal node keys.

As shown in the KRB of FIG. 5A, a plurality of encrypted keys are contained in the KRB. The encrypted key at the bottom row is Enc (K0010, K(t)001). This is a renewal node key K(t)001, encrypted by the leaf key K0001, owned by the device 2, so that the device 2 is able to decrypt the encrypted key by the device's own leaf key to obtain K(t)001. Moreover, using K(t)001, obtained on decryption, the encrypted keys Enc(K(t)001, K(t)00) in the second row from the bottom of FIG. 5A can be decrypted to yield the renewed node key K(t)00. In a similar sequence of operations, the encrypted keys Enc(K(t)00, K(t)0) in the second row from top of FIG. 5A can be decrypted to give a renewed node key K(t)0, whilst the encrypted keys Enc(K(t)0, K(t)R) in the first row from top of FIG. 5A can be decrypted to give K(t)R. As for the devices 0 and 1, the node key K000 is not to be renewed. It is only K(t)00, K(t)0 and K(t)R that are needed as renewal node keys. As for the devices 0 and 1, the encrypted keys Enc(K000, K(t)00) in the third row from top of FIG. 5A are decrypted to obtain K(t)00. Similarly, the encrypted keys Enc(K(t)00, K(t)0) in the second row from top of FIG. 5A are decoded to give a renewal node key K(t)0 and the encrypted keys Enc(K(t)0, K(t)R) in the first row from top of FIG. 5A are decrypted to give K(t)R. In this manner, the devices 0 to 2 are able to acquire the renewed keys K(t)R. Meanwhile, indices in 5A denote absolute addresses of the node and leaf keys used as decoding keys.

If renewal of the node keys K(t)0 and K(t)R in the topmost row of the tree structure shown in FIG. 4 is unneeded, while only the renewal of the node key K00 is needed, the key renewal block (KRB) of FIG. 5B may be used to distribute the renewal node key K(t)00 to the devices 0 to 2.

The KRB shown in FIG. 5B may be used in case a new master key to be co-owned by e.g., a specified group or a media key unique to a recording medium is to be distributed. As a specified instances it is assumed that the devices 0 to 3 in the group shown by a dotted line in FIG. 4 are using a certain recording medium, and that a new common master key K(t)master is needed. At this time, data Enc(K(t), K(t)master), obtained on encrypting a new common renewed master key K(t)master, using K(t)00, which is a renewed node key K00 common to the devices 0 to 3, is distributed along with the KRB shown in FIG. 5B. By this distribution, distribution as data not decrypted by an equipment of the other group, such as device 4, becomes possible. The same may be said of the media key.

That is, the devices 0 to 3 are able to decrypt the aforementioned cryptotext, using K(t)00 obtained on processing KRB to obtain the master key K(t)master or the media key K(t)media at a time point t.

Figure 6:
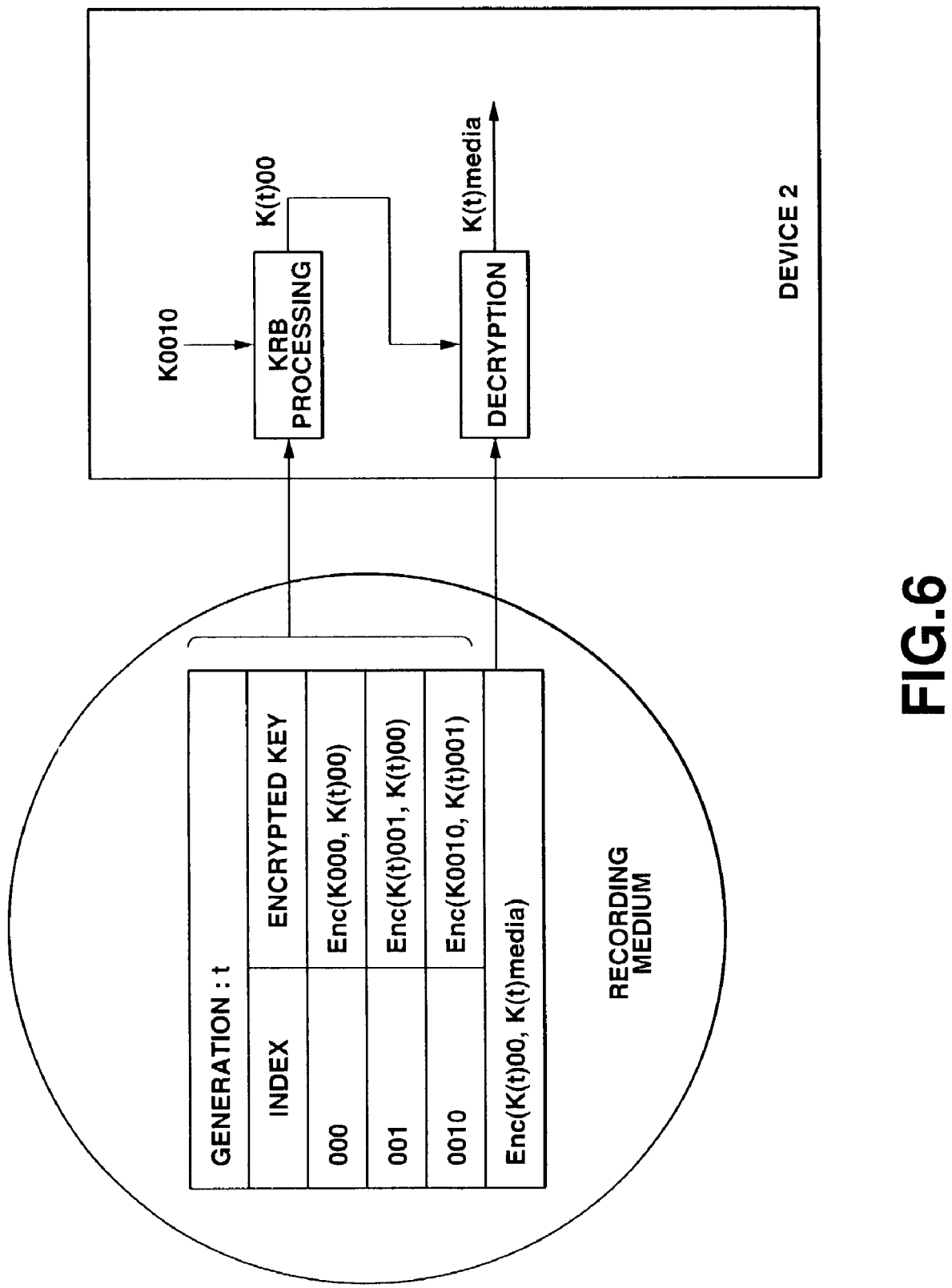
FIG. 6 shows an instance of distribution and an instance of decryption processing employing a key renewal block (KRB) for a media key in the information recording and/or reproducing device.

FIG. 6 shows, as a processing instance of obtaining the media key K(t)media at a time point t as proposed in a senior patent application of the present Assignee (JP Patent Application 2000-105328), the processing of the device 2 which has received, through the recording medium, data Enc(K(t) 00, K(t)media) which has encrypted the new common media key K(t)media using K(t)00, and the KRB shown in FIG. 5B.

It is assumed that, as shown in FIG. 4, the four devices 0 to 3 encircled in a dotted line are included in a certain recording and/or reproducing system. FIG. 6 shows the processing in finding the media key needed for the recording and/or reproducing device (device 2) to encrypt or decrypt the content on the recording medium in case the device 3 is revoked and the media key assigned from one recording medium to another is used, with the aid of a key renewal block (KRB) and a device key memorized by the recording and/or reproducing device.

In a memory of the device 2, there are safely stored the leaf key K0010, assigned only to itself, and node keys K001, K00, K0 and KR of the respective nodes 001, 00, 0 and R from the leaf key up to the root of the tree. The device 2 has to decrypt the cryptotext with the index of 0010, in the KRB stored in the recording medium of FIG. 6, with an own leaf key K0010, to calculate the node key K(t)001 of the node 001, to decrypt the cryptotext with the index 001, using the so calculated node key, to calculate the node key K(t)_00 of the node 00, and finally to decrypt the cryptotext with the index of 001, using the so calculated node key, to calculate the media key K(t)_media. The number of times of calculations is increased as the depth from the leaf to the node for encrypting the media key is increased. That is, voluminous calculations are needed in a large system where there exist a large number of recording and/or reproducing devices. The data encryption and decryption processing modes employing the so calculated and acquired media key are hereinafter explained.

Figure 7:
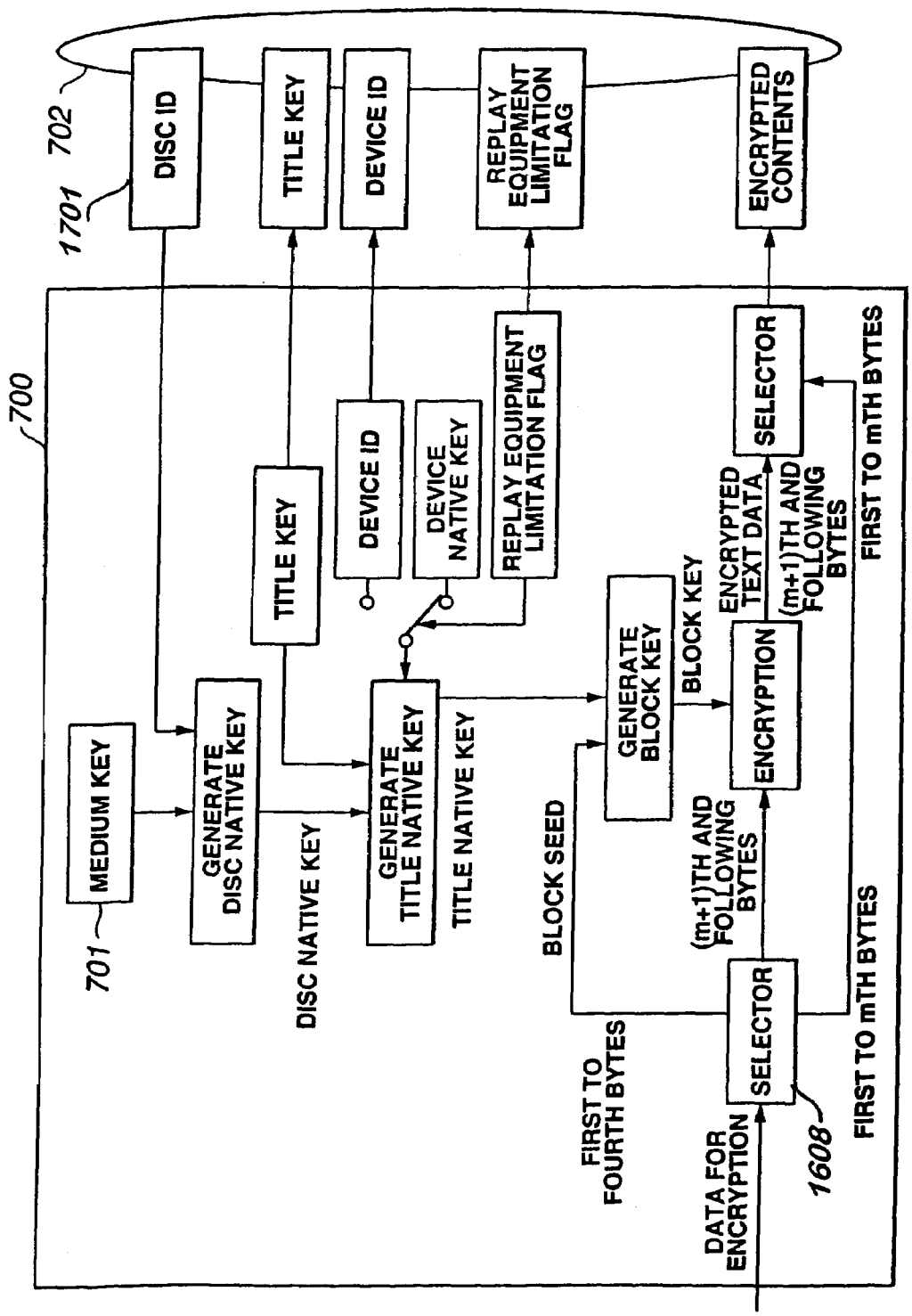
FIG. 7 is a block diagram for illustrating the encryption processing in data recording processing employing a media key in the recording and/or reproducing device according to the present invention.

Referring to the processing block diagram of FIG. 7, an example will be explained of the data encryption processing executed by the encryption processing means 150, as well as the recording and/or reproducing processing for a recording medium.

The recording and/or reproducing device 700 acquires the media key by the calculating processing based on the own KRB described above.

The recording and/or reproducing device 700 checks whether or not a disc ID has already been recorded as identification information on a recording medium 702 such as an optical disc, for example. If the disc ID has already been recorded, the disc ID is read out. If otherwise, a disc ID 1701 is generated, for example, by a random number generation method selected at random or predetermined at the encryption processing means 150. The disc ID 1701 so generated is recorded on the disc. Since only one disc ID suffices for the disc, it may be stored in a lead-in area, for example.

The recording and/or reproducing device 700 then generates a unique key for the disc, referred to herein as a "disc unique key", using the media key 701 and the disc ID. As a specified method for generating the disc unique key according to an instance 1, the results obtained on inputting the media key and the disc ID to a hash function employing a block cipher function are shown in FIG. 8. Alternatively, in the method according to instance 2 a disc unique key is employed, only a needed data length from a 160-bit output, obtained on inputting data generated on bit concatenation of the media key and the disc ID to the hash function SHA-1, as defined in FIPS (Federal Information Processing Standards Publications) 180-1.

Then, a title key, as a recording specific key, is generated in the encryption processing means 150 (see FIG. 1) at random or by a predetermined method, such as a random number generation, to record the so generated title key on the disc 702.

From a combination of the disc unique key, title key and the device ID or a combination of the disc unique key, title key and the device unique key, a title key unique to the disc is generated. Such title is hereinafter referred to as a "title unique key".

Figure 9:
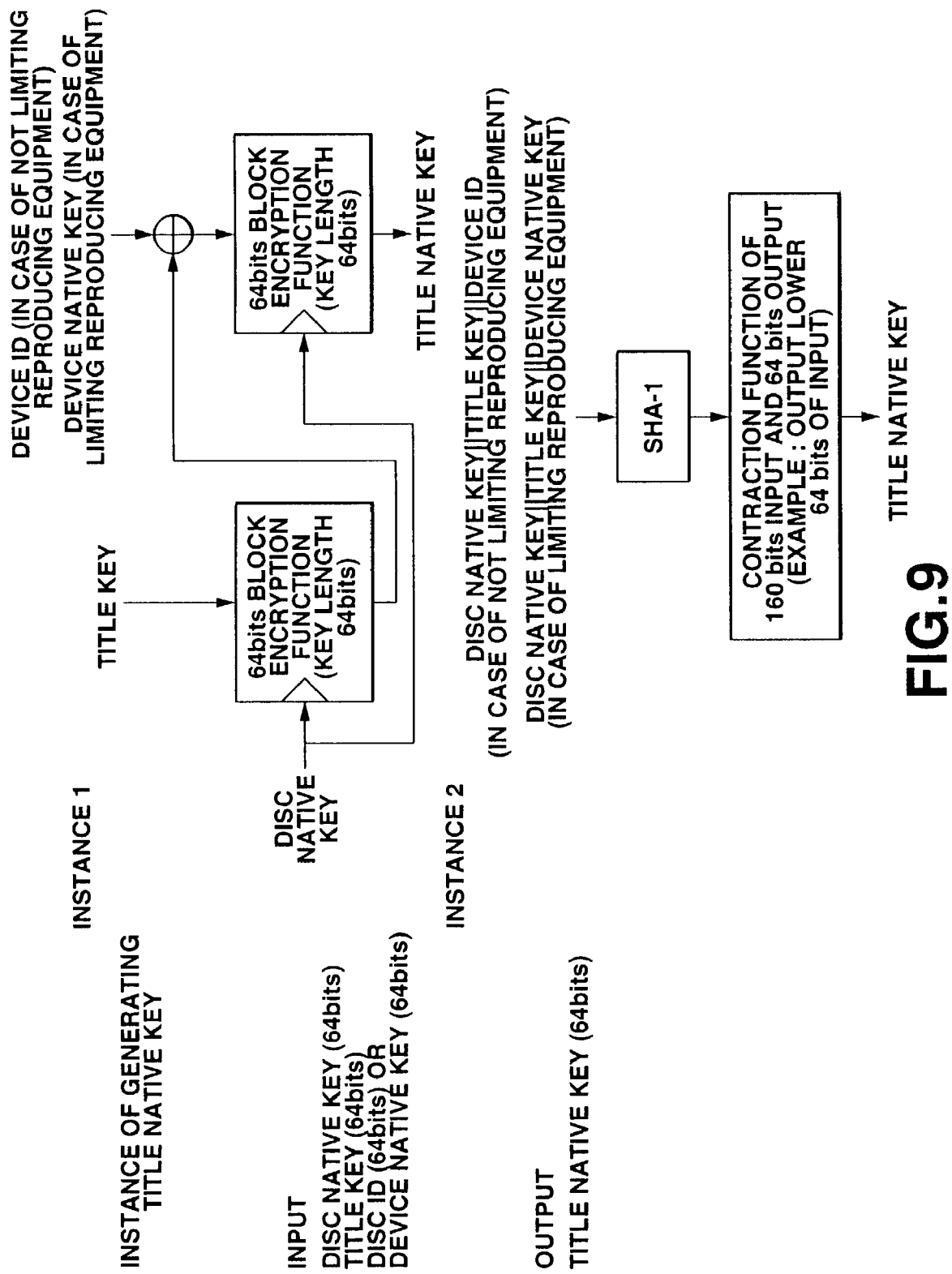
FIG. 9 shows an instance of generating and processing a key unique to a title, usable in the information recording and/or reproducing device according to the present invention.

For generating the title unique key, there may be used the method of instance 1 of employing the results obtained on inputting the title key and the disc unique key, the device ID (in case of not limiting the reproducing equipment) or the device unique key (in case of limiting the reproducing key) to the hash function employing the block cipher function, as shown in FIG. 9, or the method of the instance 2 employing, as the title unique key, only a needed data length from a 160-bit output obtained on inputting data generated on bit concatenation of the media key, disc ID and the device ID (in case of not limiting the reproducing equipment) or the device unique key (in case of limiting the reproducing key) to the hash function SHA-,1 as defined in FIPS 180-1. Meanwhile, limitation of the reproducing equipment means rendering reproduction of content data stored in the recording medium possible only in a specified reproducing device.

In the foregoing explanation, the disc unique key is generated from the media key and the disc ID, and the title unique key is generated from the disc unique key, title key and the device ID or from the title key and the device unique key. Alternatively, the title unique key may be generated directly from the media key, disc ID, title key and the device ID or device unique key, without using the disc unique key. Alternatively, a key equivalent to the title unique key may be generated from the media key, disc ID and the device ID or the device unique ID, without using the title key.

Referring again to FIG. 7, subsequent processing will be described. A block key for encrypting block data now is generated from a block seed, corresponding to block data numbered from 1 to 4 bytes of the block data, input as data for encryption, and from the previously generated title unique key.

FIG. 10 shows instances of generating the block key. FIG. 10 shows two instances of generating a 64-bit block key from a 32 bit block seed and a 64 bit title unique key.

In the instance 1, shown at the top of FIG. 10, a 64-bit cipher function is used in which the key length is 64 bits at each of an input and an output. The block seed and a 32-bit constant, concatenated together, are input and encrypted to form a block key, using the title unique key as a key for the cipher function.

The instance 2 uses the hash function SHA-1 of FIPS 180-1. The title unique key and the block seed are concatenated together and input to the SHA-1. A 160-bit output thereof is contracted to 64 bits for use as the block key, such as by retaining only the lower 64 bits.

In the foregoing, the instance of generating the disc unique key, title unique key and the block key has been explained. Alternatively, the block key may be generated using the media key, disc ID, title key, block seed and the device ID. In another alternative, the device unique key may be used from block to block to generate the block key, without generating the disc unique key or the title unique key.

When the block key is generated, block data are encrypted using the generated block key. As shown in the bottom part of FIG. 7, the leading first through mth bytes of the block data including the block seed where m is eight for example, are separated by the selector 1608, without being encrypted. Them+1 data bytes and data which follow them are encrypted. Meanwhile, the first through fourth bytes, as the block seed, are included in the non-encrypted m bytes. The block data from the m+1st byte and following are separated by the selector 1608, and encrypted in accordance with the encryption algorithm preset on the encryption processing means 150. As the encryption algorithm, the DES (data encryption standard) provided for in, for example, FIPS 46-2, may be used.

By the above processing, the content is encrypted, on the basis of a block, by a block key generated based on the generation-managed media key or block seed, for storing on the recording medium.

Figure 11:
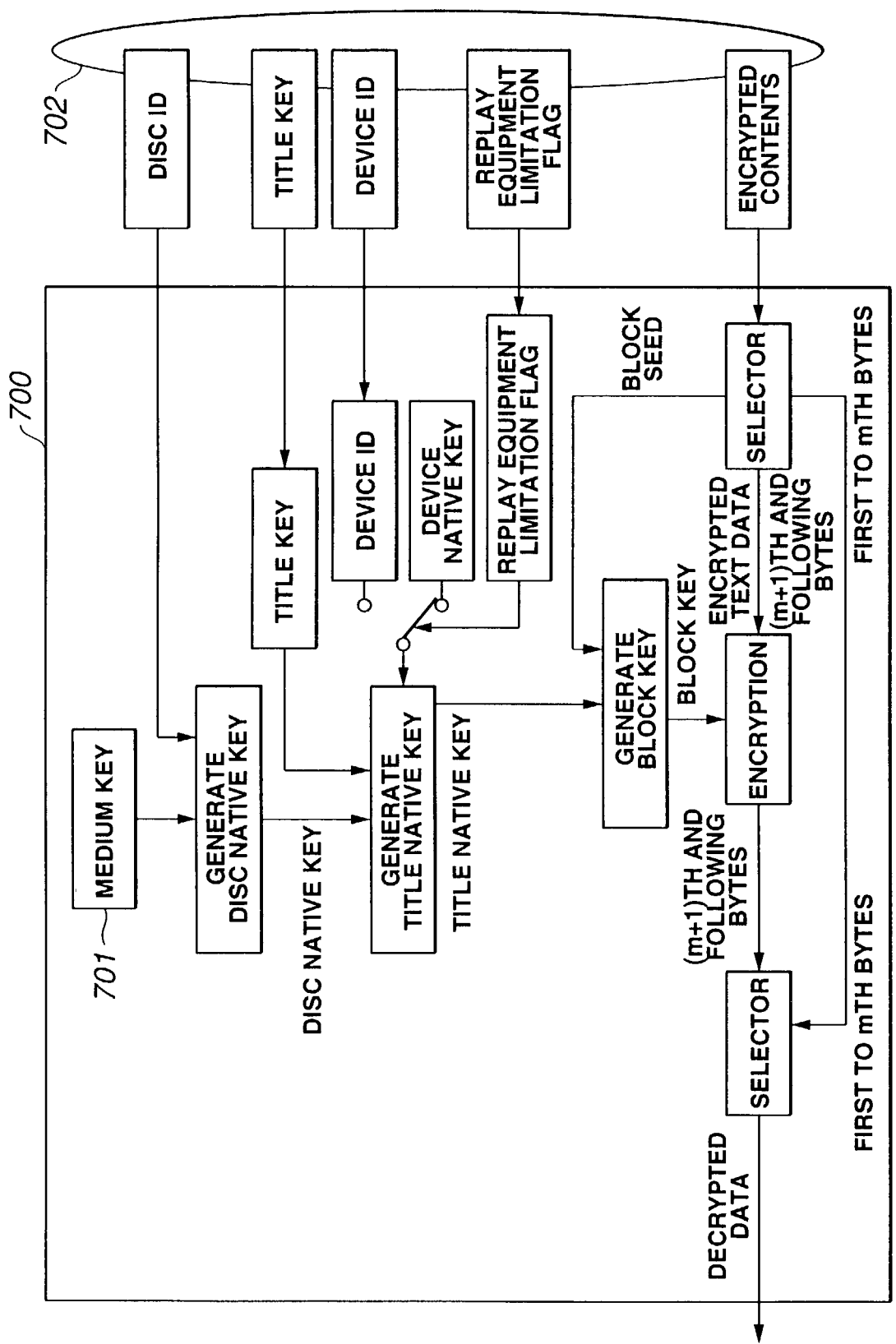
FIG. 11 is a block diagram for illustrating the decryption processing during data reproduction employing a media key in the information recording and/or reproducing device according to the present invention.

FIG. 11 is a block diagram showing the processing of decrypting encrypted content data stored in the recording medium and of reproducing the thus decrypted data.

In the reproducing processing, as in the encryption and recording processing explained with reference to FIGS. 7 to 10, a disc unique key is generated from the media key and the disc ID, a title unique key is generated from the disc unique key and the title key, and the block key is generated from the title key and the block seed as read out from the recording medium. The block-based encrypted data, read out from the recording medium 702, is decrypted, using the block key as the decrypting key.

In the above-described encryption processing used in recording content data on a recording medium and in the above-described decryption processing used in reproducing the content data from the recording medium, a media key is calculated based on the KRB. The key for encrypting or decrypting the content is then generated based on the calculated media key or other identifiers.

As described above, an embodiment has been described for generating a key used for encrypting or decrypting the content data from a media key. Alternatively, the key used for encrypting and decrypting the content key may also be generated not based on the media key but instead based on a master key which is common to a plurality of recording and/or reproducing devices or a device key unique to the recording and/or reproducing device, acquired from the KRB. The media key, master key or the device key per se, as acquired from the KRB, may also be applied as keys used for encrypting and decrypting the content data.

In these configurations, the device is requested to calculate the encrypted key required for encrypting or decrypting data, or to calculate data for generating the encrypted key needed for encrypting or decrypting data, by a plurality of decrypting processing operations, during operations of recording or reproducing data, based on the KRB stored in the recording medium of FIG. 6. The numbers of the calculations needed for this KRB processing increases with increasing depth from the leaf to the node for which the media key is encrypted. That is, the volume of calculations is increased for a system including a large number of recording and/or reproducing devices.

Figure 12:
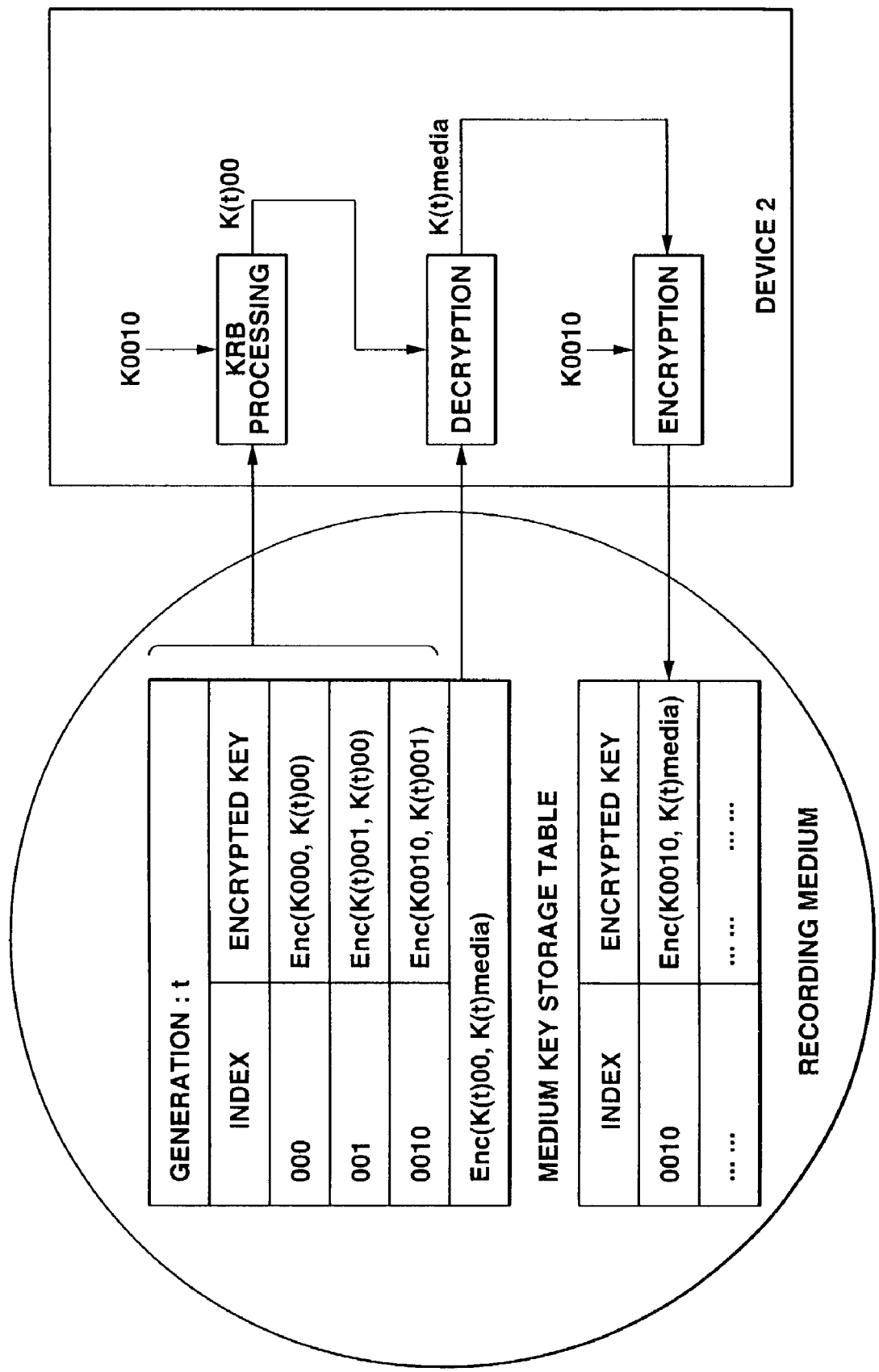
FIG. 12 shows instances of distribution, decryption and key storage processing employing the key renewal block (KRB) of the media key in the information recording and/or reproducing device according to the present invention.

FIG. 12 shows an arrangement for handling the media key of the recording and/or reproducing device designed for facilitating these processing operations, according to the present invention. In this arrangement, processing is similar to that of FIG. 6 up to type of calculations performed by the recording and/or reproducing device on the media key from the KRB stored in a recording medium. In this arrangement, the media key is encrypted using a key known only to the device in question, or a key unique to the recording and/or reproducing device, such as a leaf key assigned only to the device in question in the tree structure, and is recorded in an area provided at the outset in a recording medium, along with the identification information of the recording and/or reproducing device, such as, for example, the leaf number assigned to the recording and/or reproducing device. The device 12 of FIG. 12 encrypts the media key K(t)media acquired by KRB processing with its own leaf key K0010 and then stores the encrypted media key K(t) media in the recording medium.

In this manner, when the media key acquired through several stages of decryption processing of the KRB is used again, it can be acquired by simple decryption processing, without newly executing several stages of decryption processing as originally performed. That is, if the same recording and/or reproducing device accesses this recording medium a second time, a third time and so on, that device can obtain the media key by decrypting the cryptotext stored in the media key storage table using its own unique key, without having to execute voluminous calculations using the KRB. Moreover, since the encrypted media key stored in the recording device can be decrypted using only the leaf key that is unique to that device 2, the encrypted media key cannot be acquired by a different recording and/or reproducing device through decryption processing when the recording medium is loaded on such different device.

Figure 13:
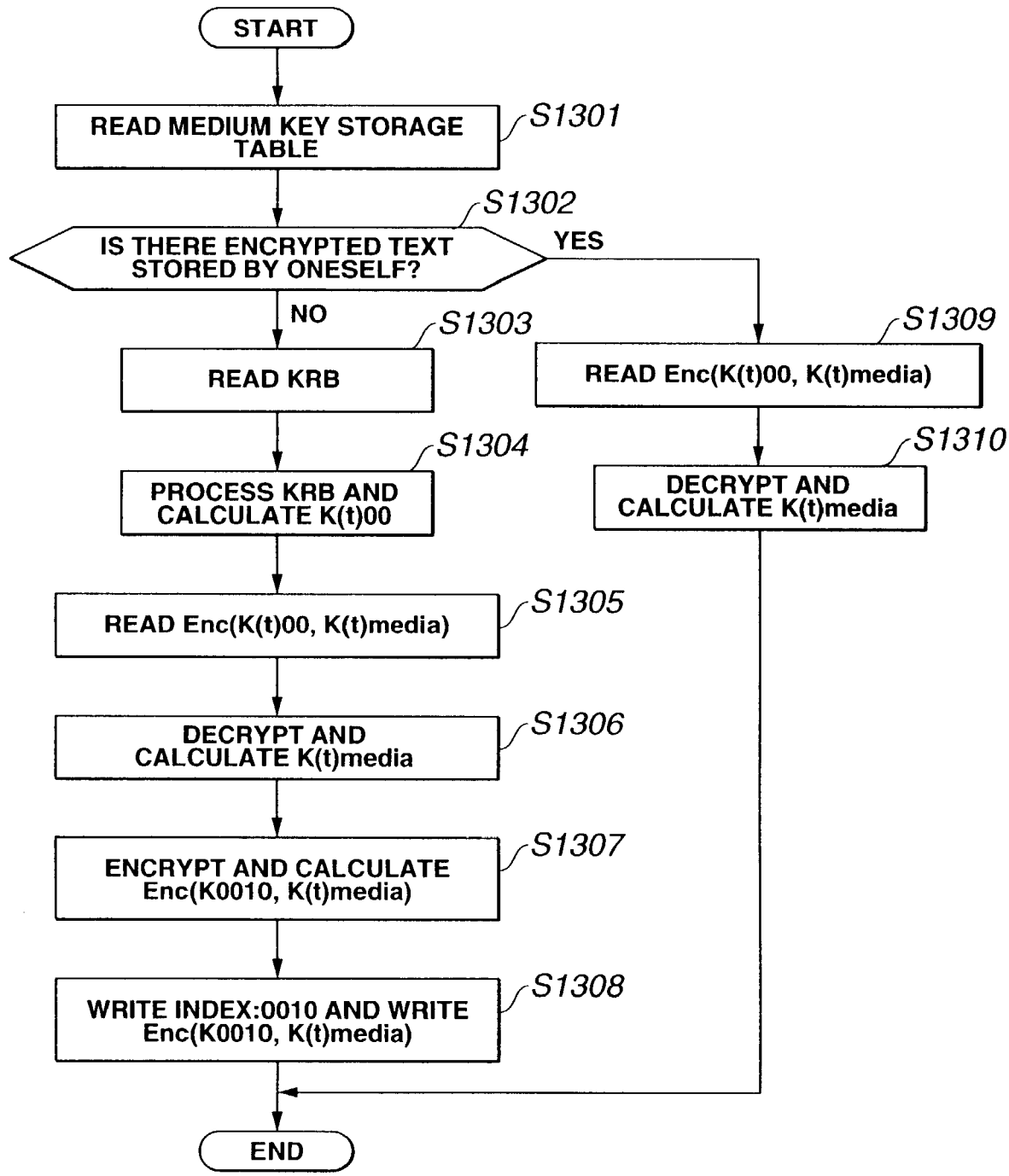
FIG. 13 shows instances of distribution, decryption and key storage processing flow (instance 1) employing the key renewal block (KRB) of the media key in the information recording and/or reproducing device according to the present invention.

FIG. 13 is a flow diagram illustrating a method for acquiring the media key when the recording and/or reproducing device accesses a recording medium, that is when the recording medium is loaded on the recording and/or reproducing device. Processing in accordance with FIG. 13 is now explained.

At step S1301, the recording and/or reproducing device reads out a media key storage table recorded on the recording medium. At step S1302, the recording and/or reproducing device checks the index part of the media key storage table to inspect whether or not there is a leaf number assigned to the medium; that is, whether or not the media key storage table contains encrypted data referred to herein as "cryptotext". If there is no such data, the recording and/or reproducing device proceeds to S1303. Otherwise, the device proceeds to step S1309.

At step S1303, the recording and/or reproducing device reads out the KRB (key renewal block) from the recording medium. At step S1304, the recording and/or reproducing device calculates the key K(t) of the node 00 at the KRB of the identification number: generation (t in FIG. 7), using the KRB read out at step S1303, the leaf key it has stored in the memory (K0010 in the device 2 of FIG. 4) and the node keys (K001, K00, . . . in the device 2 of FIG. 4).

At step S1305, a value corresponding to an encrypted representation of the media key K(t)media is read out from the recording medium, using Enc(K(t)00, K(t)media), that is K(t)00.

At step S1306, this cryptotext is decoded, using K(t)00, to calculate K(t)media. The thus calculated media key is used for encryption and decryption in recording and/or reproducing data for the recording medium.

At step S1307, the media key K(t)media is encrypted, using the leaf key which only the device in question owns (K0010 of device 2 of FIG. 4), that is, which is unique to device 2.

At step S1308, the cryptotext prepared at step S1307 and the number of the leaf key (leaf number) 0010 are recorded as identifying the device identification information on the media key storage table of the recording medium to terminate the processing.

If, at step S1302, cryptotext stored in the recording and/or reproducing device itself is found in the media key storage table of the recording medium, the device moves to step S1309 to read out the cryptotext from the recording medium.

At step S1310, the device decrypts the cryptotext using its own leaf key to thereby acquire the media key for the recording medium. This media key is used for encryption and decryption at the time of recording and reproduction of data to or from the recording medium.

Figure 14:
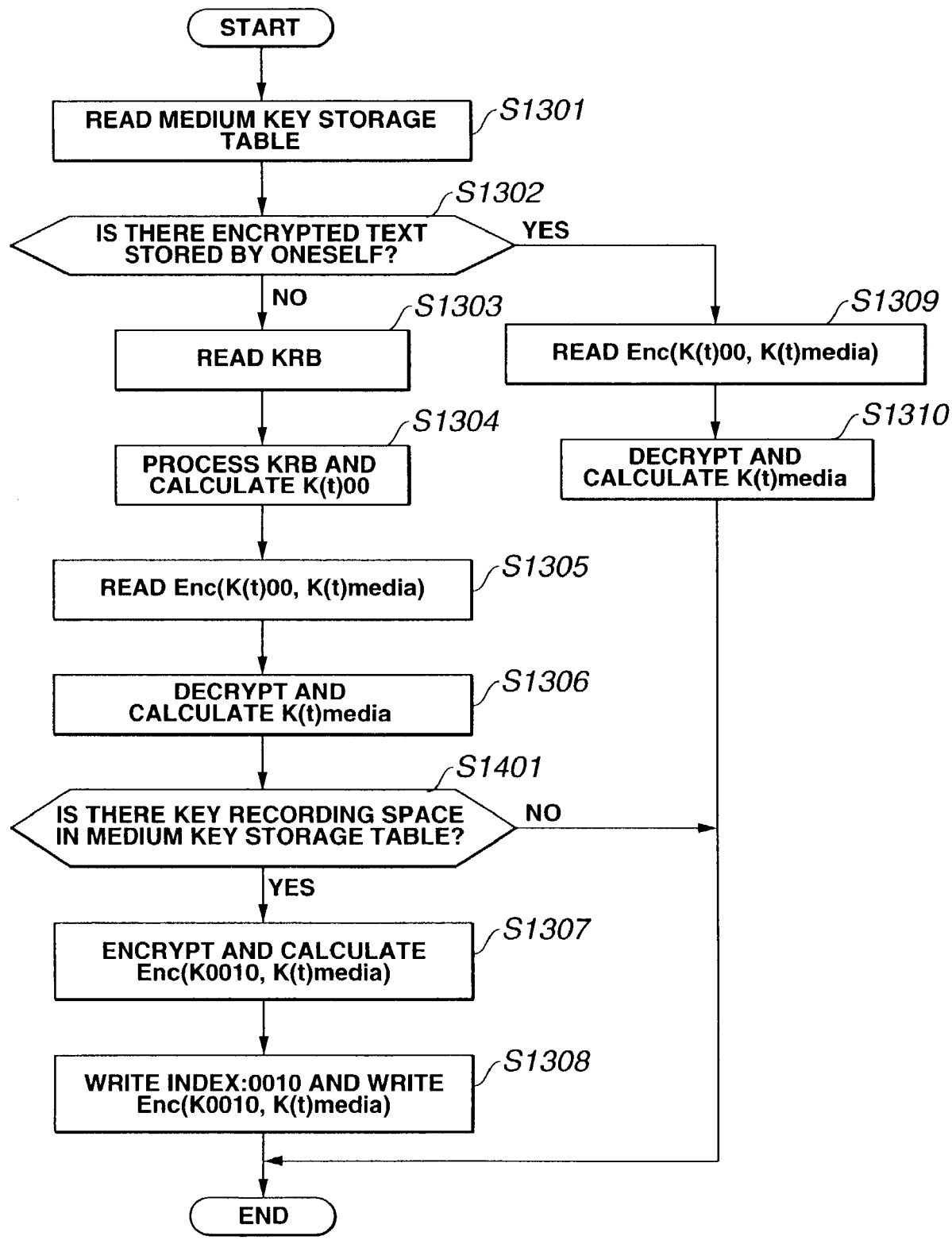
FIG. 14 shows instances of distribution, decryption and key storage processing flow (instance 2) employing the key renewal block (KRB) of the media key in the information recording and/or reproducing device according to the present invention.

In the above processing, the processing of steps S1307 and S1308 may be executed only when a set of the indexes and the cryptotext can be newly written in the media key storage table, as shown in FIG. 14.

In FIG. 14, the steps S1301 to S1306 and S1307 to S1310 are similar to those in FIG. 13 and hence need not be described again in detail.

At step S1401, the recording and/or reproducing device verifies whether or not there is any space left for it to record a key in the media storage table. If there is any space left, the program moves to step S1307 and the cryptotext is recorded in the table at step S1308. If there is no space, processing according to steps S1307 and S1308 are skipped and processing then terminates.

Figure 15:
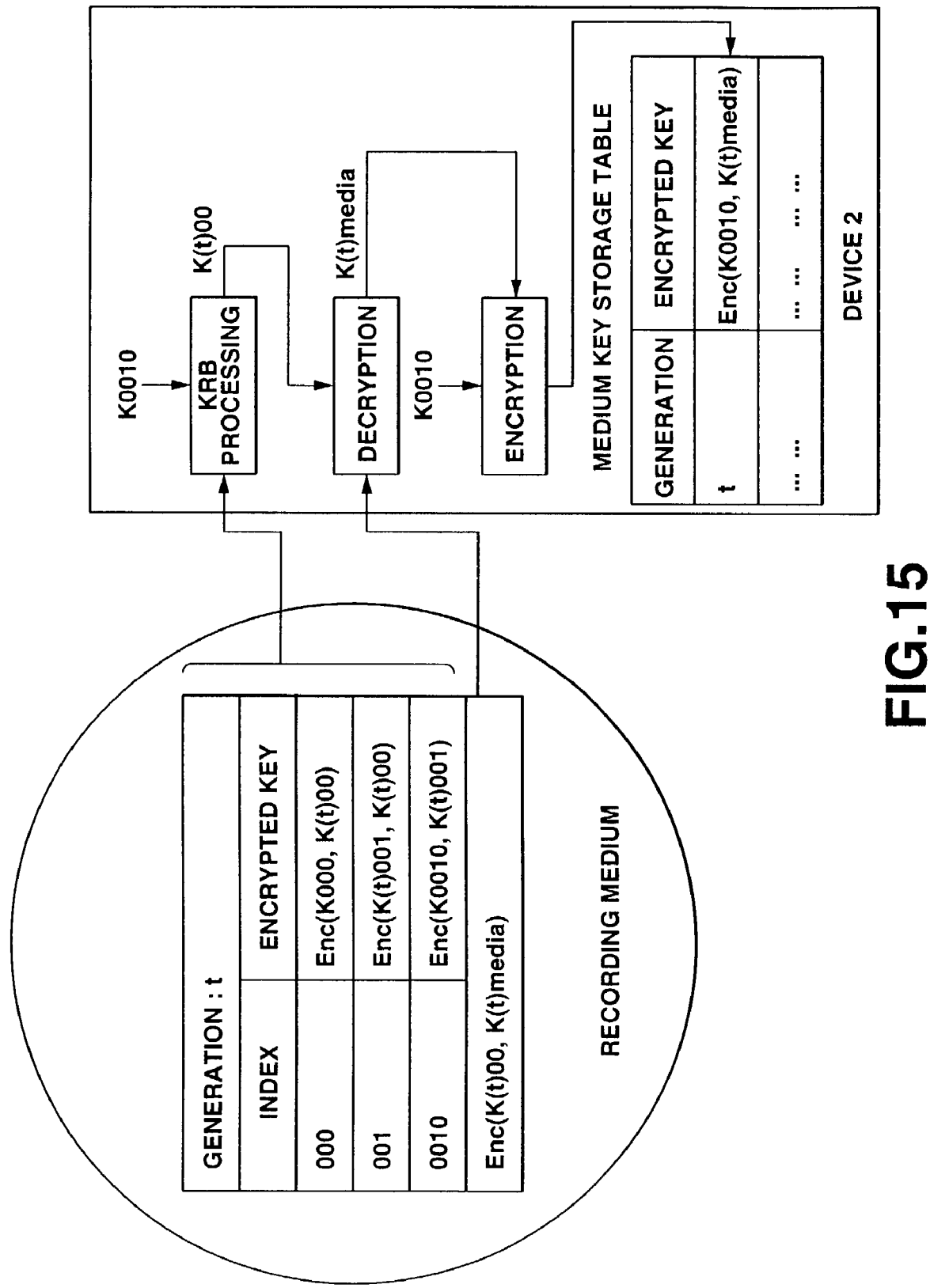
FIG. 15 shows instances of distribution, decryption and key storage processing employing the key renewal block (KRB) of the media key in the information recording and/or reproducing device according to the present invention.

In the above-described embodiments, the tables used by respective recording and/or reproducing devices are placed in the respective recording media, as explained previously with reference to FIG. 12. As shown in FIG. 15, the present embodiment, media keys specific to respective recording media are stored, in the respective recording and/or reproducing devices, such as in a memory 180 in the recording and/or reproducing device 100 shown in FIG. 1.

In storing the encrypted media keys in the memory 180 of the recording and/or reproducing device 100, such a media key storage table is used, in which encrypted media keys are associated with one another with the media key generation information as the index. This takes into account a case of storing the media keys for a plurality of different generations of the media key.

Figure 16:
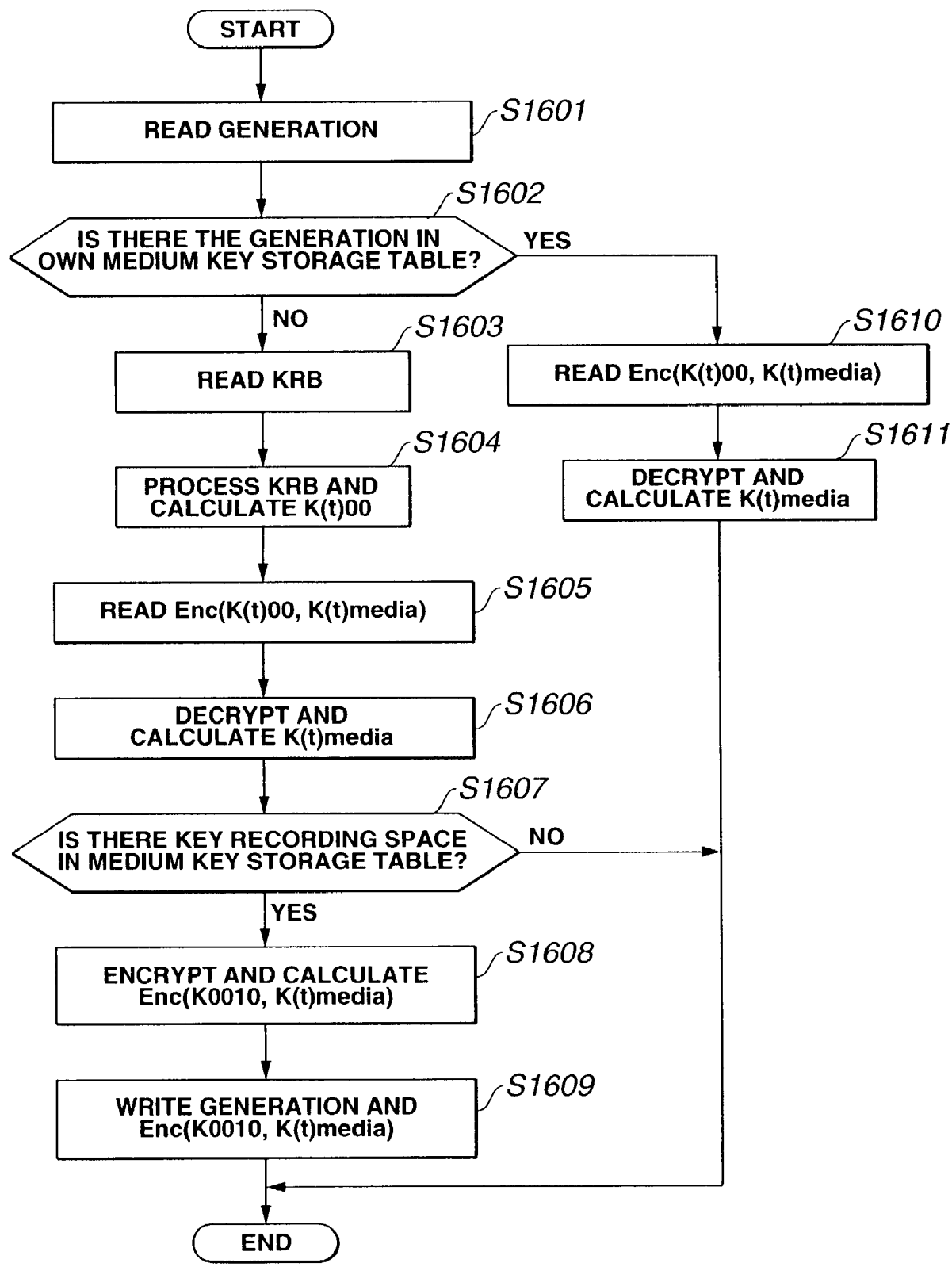
FIG. 16 shows instances of distribution, decryption and key storage processing flow employing the key renewal block (KRB) of the media key in the information recording and/or reproducing device according to the present invention.

FIG. 16 shows the flow for acquiring media keys when the recording and/or reproducing device of the present embodiment accesses the recording medium, that is, when the recording medium is loaded on the recording and/or reproducing device.

At step S1601, the recording and/or reproducing device reads out the KRB generation (t in the instance of FIG. 15) as an identification number of the media key from the recording medium.

At step S1602, the recording and/or reproducing device inspects whether or not the media key having the generation equal to t is stored in the media key storage table kept by the device itself. If such media key is not stored in the media key storage table, the recording and/or reproducing device proceeds to step S1603 and, if otherwise, proceeds to step S1610.

The processing of steps S1603 to S1606 is similar to that of S1301 to 1306 of FIG. 13, respectively, and hence need not be described again in detail. By this processing, the recording and/or reproducing equipment acquires a media key. The thus calculated media key is used for encryption and decryption at the time of recording and reproduction.

At step S1607, the recording and/or reproducing equipment checks whether or not there is any space for storage of a new media key in its own media key storage table. If there is any space, the recording and/or reproducing equipment proceeds to step S1608 If there is no space, the processing of steps S1608 and S1609 is skipped, and processing then terminates.

At step S1608, as at step S1307 of FIG. 13, the equipment encrypts the media key using its own leaf key. At step S1609, the resulting cryptotext is stored in the media key storage table along with the identification information identifying the generation.

At step S1602, if the cryptotext corresponding to the generation is found in the media key storage table, the recording and/or reproducing equipment proceeds to step S1610 to read out the cryptotext from the media key storage table. At step S1611, as at S1310 of FIG. 13, the recording and/or reproducing equipment decrypts the cryptotext using its own leaf key, to acquire the media key of the recording medium. This media key is used for data encryption and decryption in recording and reproducing the data on or from the recording medium.

Figure 17:
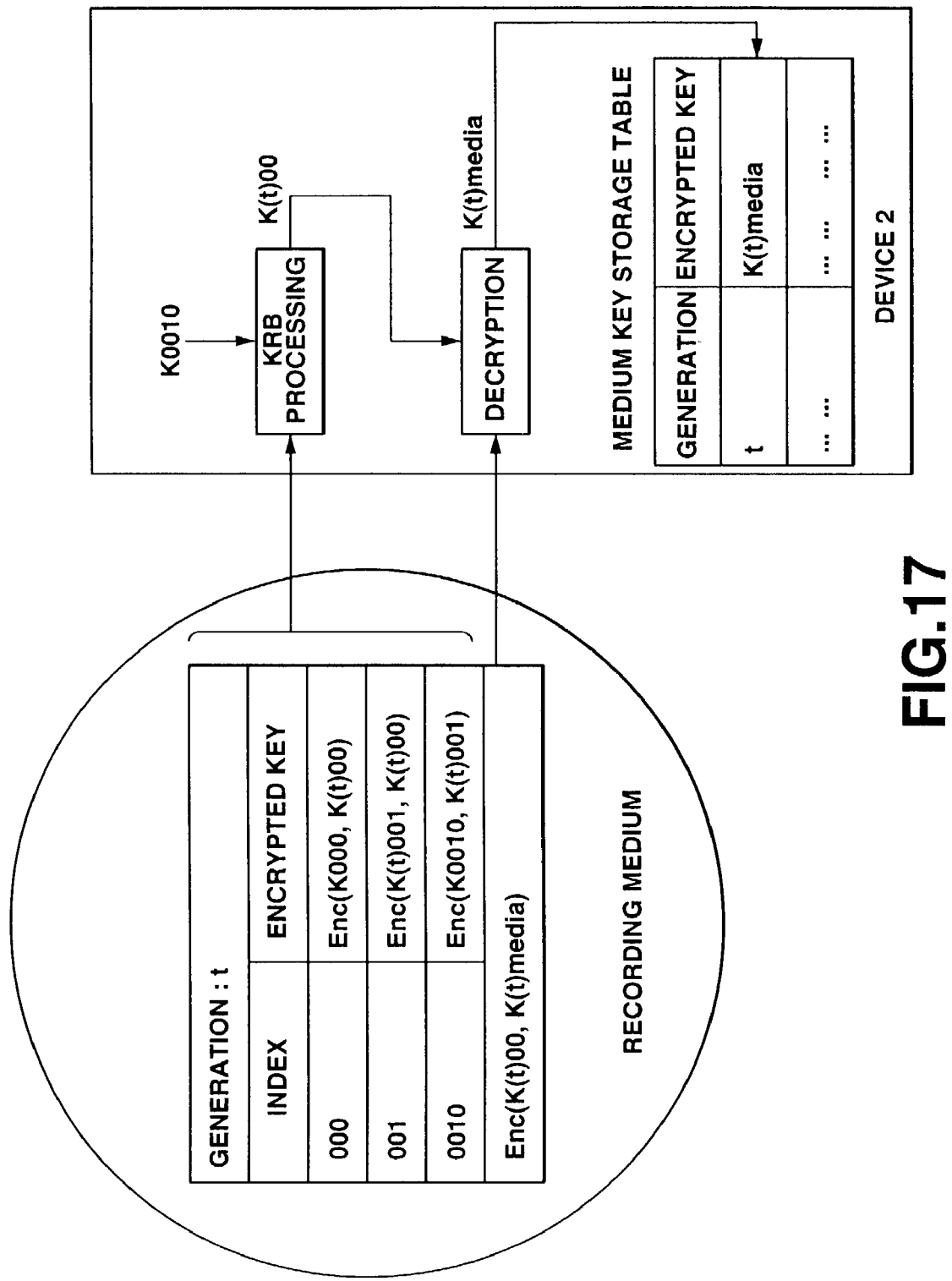
FIG. 17 shows instances of distribution, decryption and key storage processing employing the key renewal block (KRB) of the media key in a modification of the information recording and/or reproducing device according to the present invention.

In the above-described embodiment, the leaf key belonging to the recording and/or reproducing equipment is used for encrypting the media key prior to storing it in the media key storage table. However, if safe recording may be made without the content of the media key storage table becoming disclosed to devices other than the device which records the media key in the media key storage table, encryption is not mandatory. That is, it suffices if the media key K(t)media obtained on decrypting the KRB is stored directly, that is without encryption, together with the generation as the index, as shown in FIG. 17. If, in this case, the media key K(t)media is re-used, making subsequent decryption processing of the media key unnecessary.

The above-described embodiments may also be combined such that the media key storage table is owned by both the recording medium and the recording and/or reproducing equipment.

The above example has been explained in terms of acquiring a media key through processing of a KRB. This method, however, is not specific to the media key, and may, of course, be applied to a master key, common to a plurality of equipment pieces, stored in the pieces of equipment, or to a device key unique to an individual equipment.

In the above instance, the expression "key renewal block" (KRB) is used for describing data used in a method for distributing the keys. It should be apparent from the foregoing description that use of the key renewal block is not limited to key renewal but may be applied in general to key distribution at large.

Figure 18:
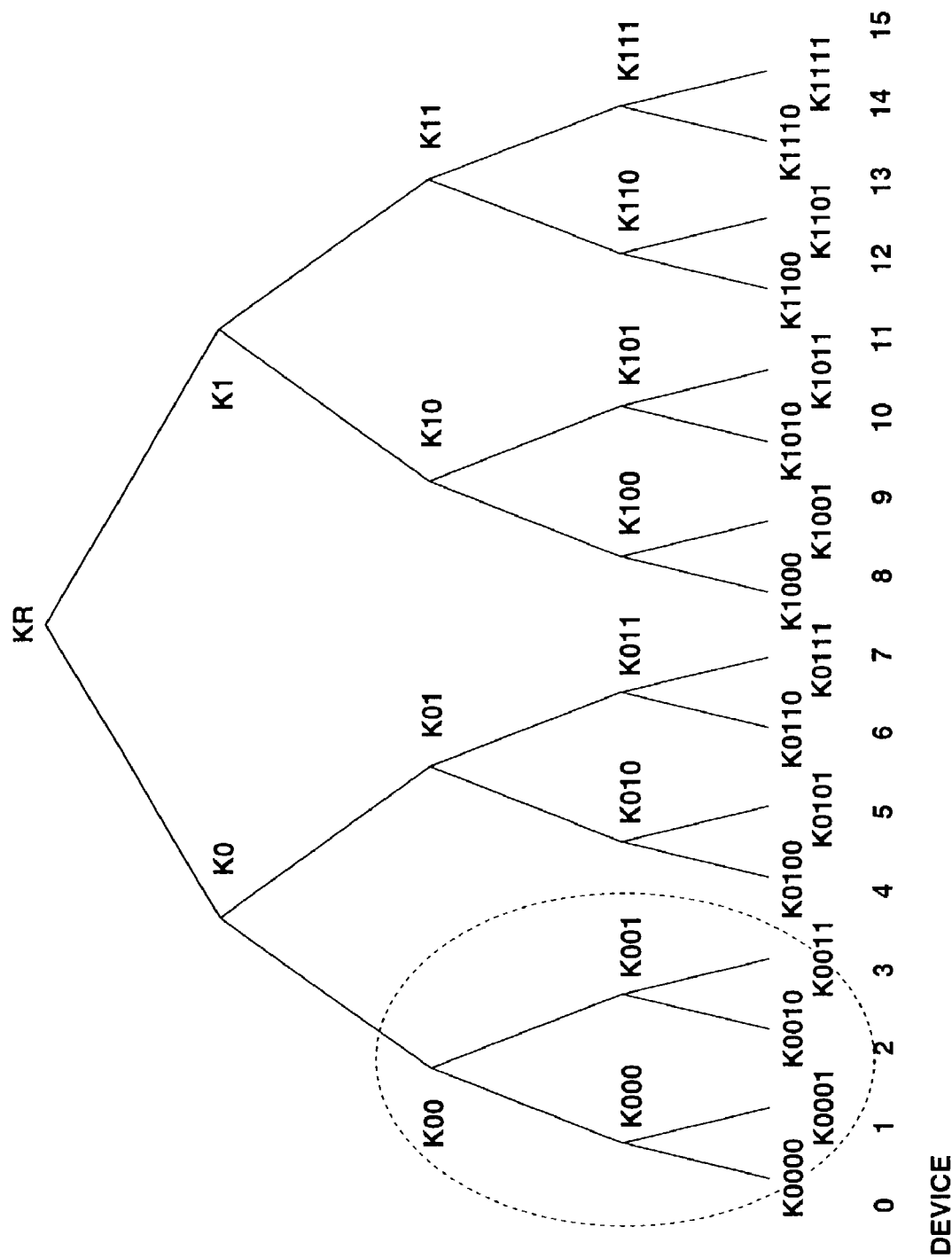
FIG. 18 shows a tree structure for illustrating the encryption processing of a key, such as a content key, for the information recording and/or reproducing device according to the present invention.

An embodiment has been described in which the recording and/or reproducing equipment shown in FIG. 1 distributes keys to respective equipment, such as a content key which is required for recording or reproducing data on or from the recording medium. Meanwhile, the content key is a key used for decrypting the encrypted content distributed over the communication medium or through a recording medium. FIG. 18 shows the key distribution configuration in the recording and/or reproducing equipment in the recording system employing the present system. The numbers 0 to 15 shown at the bottom row in FIG. 18 represent respective recording and/or reproducing equipment. That is, the respective leaves of the tree structure shown in FIG. 18 correspond to the respective recording and/or reproducing devices.

In each of the respective devices 0 to 15, there are stored, at the time of manufacture (shipment), the keys (node keys), allocated to respective nodes from the device's own leaf to the root in the preset initial tree. K0000 to K1111 shown at the bottom row of FIG. 18 represent leaf keys allocated to the respective devices 0 to 15, with the keys KR to K111 as from the topmost row KR to the second node as from the bottom row being node keys.

In the tree structure shown in FIG. 18, the device 0, for example, owns the leaf key K0000 and the node keys K000, K00, K0 and KR. The device 15 owns the leaf key K1111, and node keys K111, K11, K1 and KR. Although only 16 devices numbered 0 to 15 are shown in the tree of FIG. 4, with the tree configuration being of well-balanced left-right symmetrical structure in four rows, more devices may be indicated in a tree, while the number of rows in the tree structure may differ from that shown therein.

The recording and/or reproducing devices included in the network having a tree structure shown in FIG. 18, include recording and/or reproducing devices of various types which may employ a variety of different types of recording media, such as DVD, CD, MD or Memory Stick (trademark). Moreover, it may be assumed that a variety of application services co-exist within the network. The key distribution configuration shown in FIG. 18 is applied to this assumed configuration of different co-existing applications.

In the system where such varied devices and applications co-exist, the portion surrounded by a dotted line in FIG. 18, that is devices 0 to 3, is set as one group employing one and the same recording medium. For the devices in this group defined by the dotted line, processing operations, can be performed simultaneously, such as encrypting common content to be forwarded from a provider, forwarding of a commonly used master key, or outputting payment data for a content fee in a similarly encrypted form to a provider or to a settlement organization. The organization responsible for data transmission and reception to or from respective devices, such as the content providers or settlement organizations, perform the forwarding of the data in a lumped form for the group of devices 0 to 3 as defined by the dotted line in FIG. 18. A plurality of such groups exist in the tree structure network shown in FIG. 18.

It should be noted that the node and leaf keys may be supervised in a concentrated fashion by a sole key management center, or, alternatively on a group basis by the providers or settlement organizations transmitting or receiving a variety of data to or from the respective groups. In case the security of a key is compromised, the node or leaf keys are renewed by the key management center, provider or by the settlement organizations.

As may be seen from FIG. 18, the four devices 0 to 3 of one group own common keys K00, K0 and KR as node keys. By exploiting this node key co-owning configuration, in one example of operation, it becomes possible to furnish a common master key only to the devices 0 to 3. For example, if the co-owned node key K00 itself is set as a master key, a common master key can be set only for the devices 0 to 3 without executing new key forwarding operations. Moreover, if a value Enc (K00, Kcontent), obtained on encrypting a new content key Kcontent with a node key K00, is distributed over the network or as it is stored on a recording medium, only the devices 0 to 3 are able to decrypt the cipher Enc (K00, Kcontent) to obtain the content key Kcontent. As above, the notation "Enc (Ka, Kb)" indicates data obtained on encrypting a key "Kb" with another key "Ka".

If it is revealed at a certain time point t that the security of the keys owned by the device 3, that is keys K0011, K001, K00, K0 and KR were compromised, such as through efforts of a hacker and are no longer secure, the device 3 subsequently needs to be separated from the "system" (the group of the devices 0 to 3) in order to protect data transmitted or received in the system. To this end, the node keys K001, K00, K0 and KR must be renewed to new keys K(t)001, K(t)00, K(t)0 and K(t)R, respectively, while these renewed keys must be transmitted to the devices 0, 1 and 2. Here, the notation "K(t)aaa" denotes that it is a renewed key of a key "Kaaa" at a generation time t.

The processing of distributing a renewal-key will now be described. The renewal of a key is executed by storing a table formed by block data which is referred to herein as a key renewal block (KRB). Such KRB is shown for example in FIG. 19A. In this processing method, the table is stored initially at a point or in a network or in a recording medium and then sent to the devices 0 to 2.

The key renewal block (KRB), shown in FIG. 19A, is formed as block data have a structure in which renewal is possible only for the devices in need of renewal of node keys. The block data shown in FIG. 19A are formed with a view to distributing a renewal node key of the generation t to the devices 0, 1 and 2 of the tree structure shown in FIG. 18. As may be seen from FIG. 18, the devices 0 and 1 are in need of K(t)00, K(t)0 and K(t)R, as renewal node keys, while the device 2 is in need of K(t)001, K(t)00, K(t)0 and K(t)R, as renewal node keys.

As shown in the KRB of FIG. 19A, a plurality of encrypted keys are contained in the KRB. The encrypted key at the bottom row is Enc (K0010, K(t)001). This is a renewed node key K(t)001, encrypted by the leaf key K0010 which is owned by the device 2, so that the device 2 is able to decrypt the encrypted key by the device's own leaf key to obtain K(t)001. Moreover, using K(t)001, obtained on decryption, the encrypted keys Enc(K(t)001, K(t)00) in the second row from the bottom of FIG. 19A can be decrypted to yield the renewed node key K(t)00. In a similar sequence, the encrypted keys Enc(K(t)00, K(t)0) in the second row from top of FIG. 19A can be decrypted to yield a renewed node key K(t)0, while the encrypted keys Enc(K(t)0, K(t)R) in the first row from top of FIG. 19A can be decrypted to yield K(t)R. As for the devices 0 and 1, on the other hand, the node key K000 is not to be renewed. It is only K(t)00, K(t)0 and K(t)R that are needed as renewal node keys. As for the devices 0 and 1, the encrypted keys Enc(K000, K(t)00) in the third row from the top of FIG. 19A are decrypted to obtain K(t)00. Similarly, the encrypted keys Enc(K(t)00, K(t)0) in the second row from top of FIG. 19A are decrypted to yield a renewal node key K(t)0 and the encrypted keys Enc(K(t)0, K(t)R) in the first row from top of FIG. 19A are decrypted to yield K(t)R. In this manner, the devices 0 to 2 are able to acquire the renewed keys K(t)R. Meanwhile, indices in FIG. 19A denote absolute addresses used for decrypting keys.

If renewal of the node keys K(t)0 and K(t)R in the uppermost row of the tree structure network shown in FIG. 18 is not needed and only the renewal of the node key K00 is needed, the key renewal block (KRB) of FIG. 19B may be used to distribute the renewal node key K(t)00 to the devices 0 to 2.

The KRB shown in FIG. 19B may be used in case a content key co-owned by a specified group, a master key or a media key unique to a recording medium is to be distributed. As a specific instance, it is assumed that the devices 0 to 3 in the group shown by a dotted line in FIG. 18 need to be supplied with the content encrypted using the content key, the content key being the encrypted content key K(s)content, where s is a content ID for identifying the content. At this time, data Enc(K(t), K(s)content), obtained on encrypting a common node key K(s)content using K(t)00, which is a renewed node key K00 common to the devices 0 to 3, is distributed along with KRB shown in FIG. 19B. In this distribution arrangement, it becomes possible for a device from another group, such as device 4 to distribute data without having to decrypt that data prior to distributing it, such as to devices 0 to 3. The same may be said of other keys, such as a media key.

That is, the devices 0 to 3 are able to decrypt the distributed cryptotext, using K(t)00 obtained on processing KRB, to obtain the content key K(s)content or the media key K(t)media at a time point t.

Figure 20:
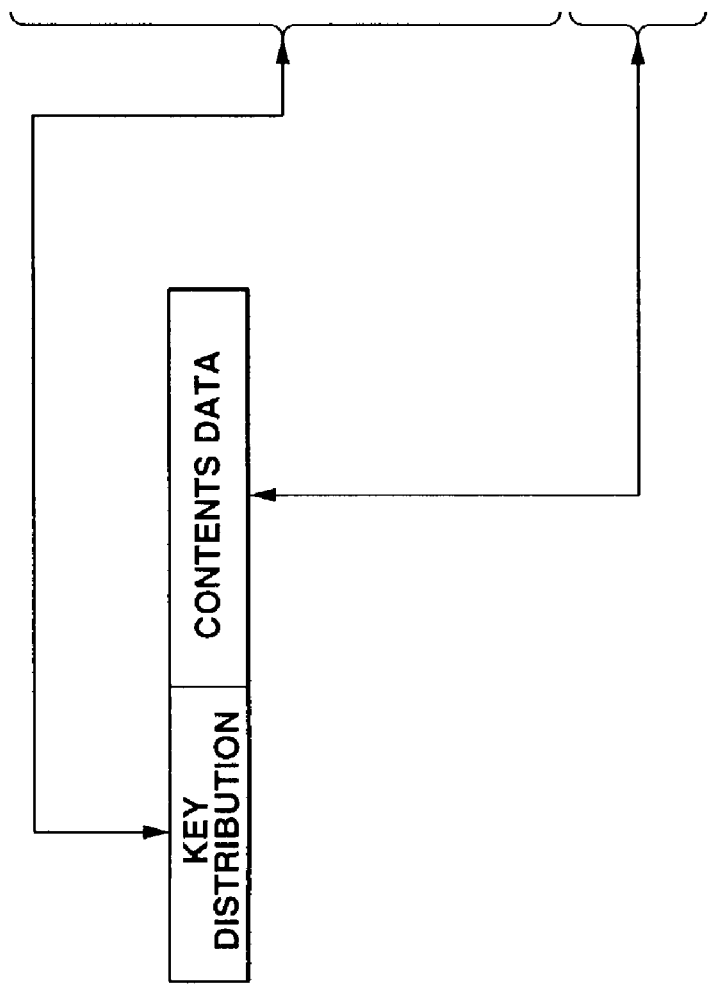
FIG. 20 shows an illustrative data structure at the time of furnishing content and a content key for the information recording and/or reproducing device according to the present invention.

If the content, such as music data, encrypted using the content key, is furnished to the information recording and/or reproducing equipment located at the respective leaves of the tree structure network as in the above-described key distribution configuration, the data structure is as shown in FIG. 20.

As shown in FIG. 20, the data structure includes a key distributing portion and a content data portion. The key distributing portion has the above-described key renewal block (KRB) and a content key K(s)content encrypted by a renewal node key obtained by the processing of the key renewal block (KRB). The content data portion has stored therein content "Enc(K(s)content, Content)" as encrypted by the content key "K(s)content".

The information recording and/or reproducing equipment being, able to acquire updated node keys by processing the key renewal block (KRB) as described above, can be set in many ways. If the encrypted content is furnished according to the arrangement shown in FIG. 20, it is possible to provide the content that can be decrypted only by a specified information processing device.

Figure 21:
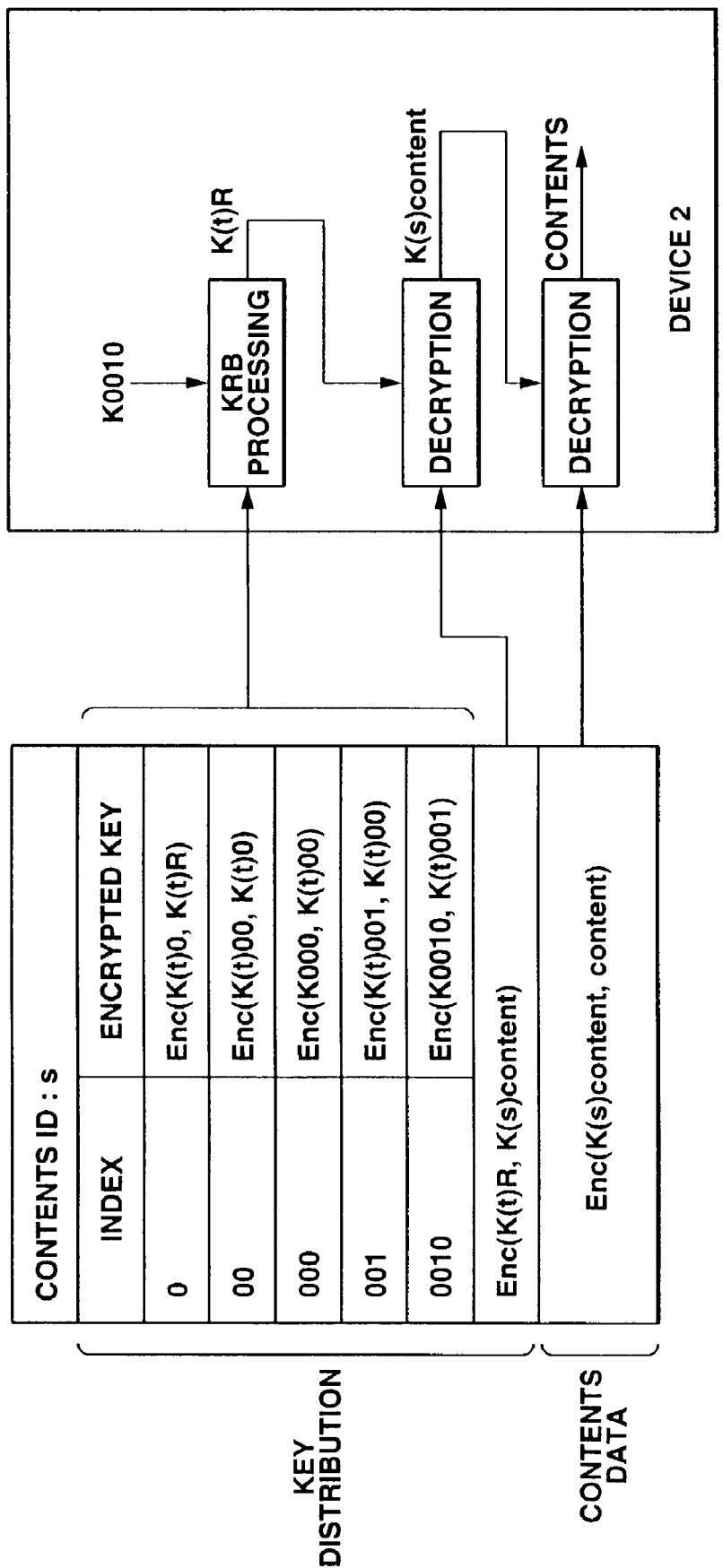
FIG. 21 shows instances of distribution, decryption and key storage processing employing a key renewal block (KRB) of a content key in the information recording and/or reproducing device.

FIG. 21 illustrates an example of utilizing the content encrypted by the content ID=s content key "K(s)content", as described in commonly owned published Japanese Patent Application JP2000-105329. In such example, the device 2 processes the KRB with its leaf key K0010 to acquire content key "K(s)content". Using the acquired key K(s) content, the device 2 can then acquire the content from the encrypted data "Enc(K(s)content, content)".

It is assumed that a certain recording and/or reproducing system includes four devices 0 to 4 surrounded by a dotted line, as shown in FIG. 18. FIG. 21 shows that when the content key K(s) is used with the device 3 revoked, the processing of data received by the recording and/or reproducing device (device 2), includes finding the content key K(s) content based on the key renewal block (KRB) stored in a recording medium.

In the memory of the device 2, there are safely stored the leaf key K0010 allocated to the device 2 itself and node keys for nodes 001, 00, 0, R (K001, K00, K0 and KR), from the leaf key K0010 to the key for the node at the root of the tree. The device 2 decrypts the cryptotext having the index of 0010 from the KRB stored in the recording medium of FIG. 21 using its own leaf key K0010 to calculate the node key K(t)001 of the node 001. Then, using the thus calculated node key K(t)001, the device 2 decrypts the cryptotext having the index of 001 to calculate the node key K(t)00 of the node 00. Then, using that calculated node key, the device 2 decrypts the cryptotext having the index of 00 to calculate K(t)0 of the node 0. Finally, the device 2 decrypts that cryptotext having the index 0 to calculate the node key K(t)R of the node R. Then, using the node key K(t)R, the device 2 decrypts Enc(K(t)R, K(s) content) to acquire the content key K(s)content with the content. ID=0.

Then, the acquired content key K(s) content, the encrypted content Enc: Enc(K(s), Content) stored in the content data portion is decrypted to acquire the content.

The decryption processing of the encrypted content becomes possible by executing all of these processing steps. For the processing of acquiring the renewal node key by the processing of the key renewal block (KRB) as described above, it is necessary to repeat the similar decrypting operations a number of times. The number of times of the calculations, needed for this KRB processing is increased with increasing depth from the leaf to the node with the encrypted content key. That is, the volume of calculations is increased for a system including a large number of recording and/or reproducing device.

In reproducing the content in the information recording and/or reproducing device, it is necessary to calculate the content key by a plurality of decrypting operations based on the KRB stored e.g., in the recording medium. For example, if the content key is set as a key different from one content to another, the aforementioned KRB processing needs to be executed each time the content is reproduced.

Figure 22:
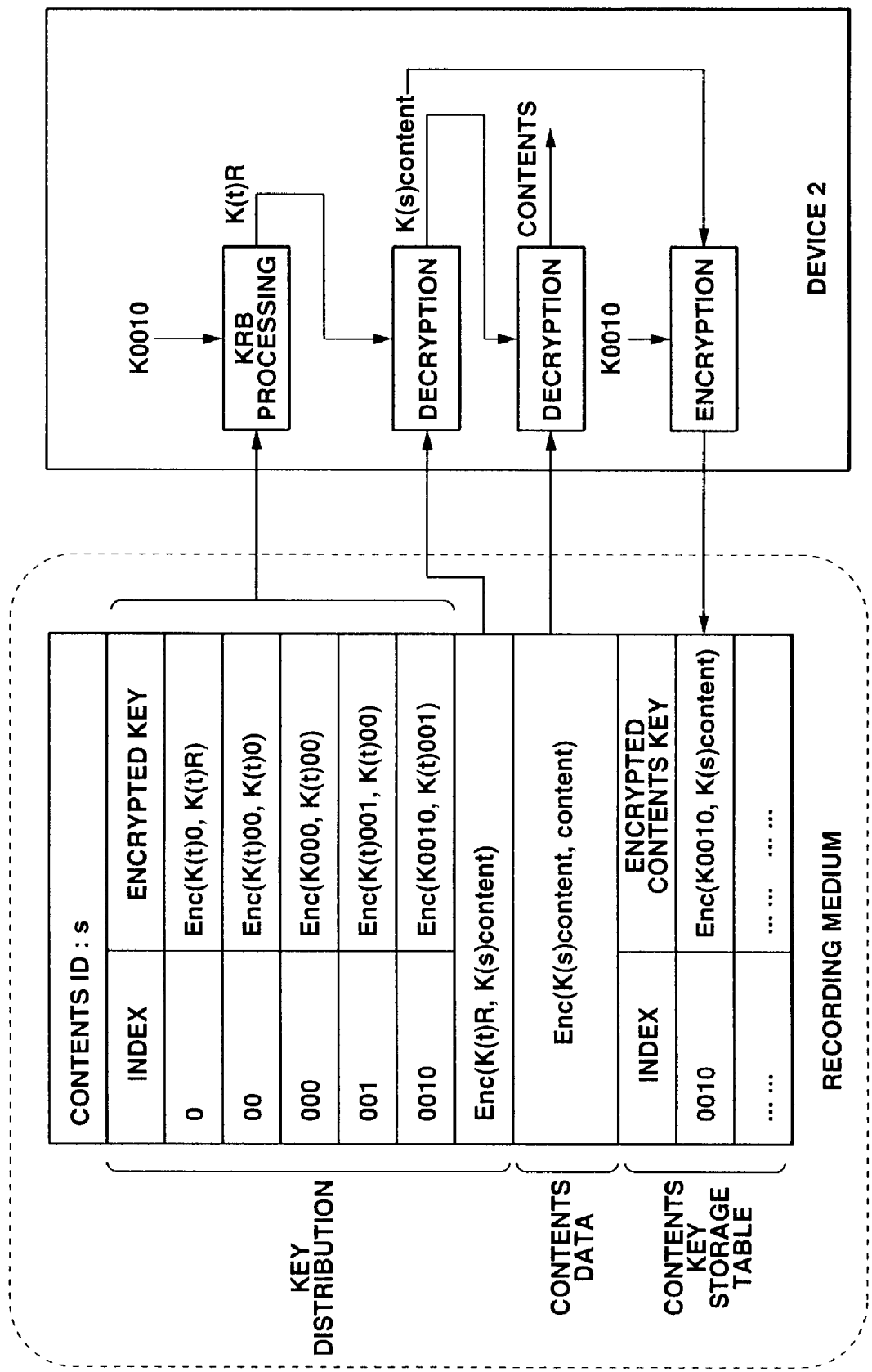
FIG. 22 shows instances of distribution, decryption and key storage processing employing a key renewal block (KRB) of a content key in the information recording and/or reproducing device according to the present invention.

FIG. 22 shows an embodiment for handling the content key of the recording and/or reproducing device of the present invention for relieving the processing load. This embodiment is similar to that shown in FIG. 21 up to calculations of the content key by the recording and/or reproducing device. In this embodiment, the content key is encrypted using a key known only to the particular device; that is, a key unique to the recording and/or reproducing device. For example, the unique key may be a leaf key assigned only to the particular device in the tree structure, which is recorded in an area provided at the outset therefor in a recording medium along with the identification information of the recording and/or reproducing device, such as, for example, the leaf number assigned to the recording and/or reproducing device. In the case of the device 2, as an example, as shown in FIG. 22, the content key Enc(K0010, K(s) content), being encrypted using the leaf key, is stored in the recording medium in a content key storage table as a set with the corresponding content.

By employing the storage configuration of the content key storage table, described above, the content key can be acquired solely by simple decoding processing, in case of re-using the content key acquired through multiple stages of the KRB decryption processing, without the necessity of executing the multiple stages of decrypting processing anew. That is, if the same recording and/or reproducing device accesses the recording medium a second time, a third time and so on, the content key can be acquired by decrypting the cryptotext stored in the content key storage table with the device's unique key without the necessity of executing voluminous calculations with the KRB. Moreover, since the encrypted content key stored in the device can be decrypted using only the leaf key unique to the device, the encrypted content cannot be decrypted and acquired in this form even if the recording medium is loaded on another device.

Figure 23:
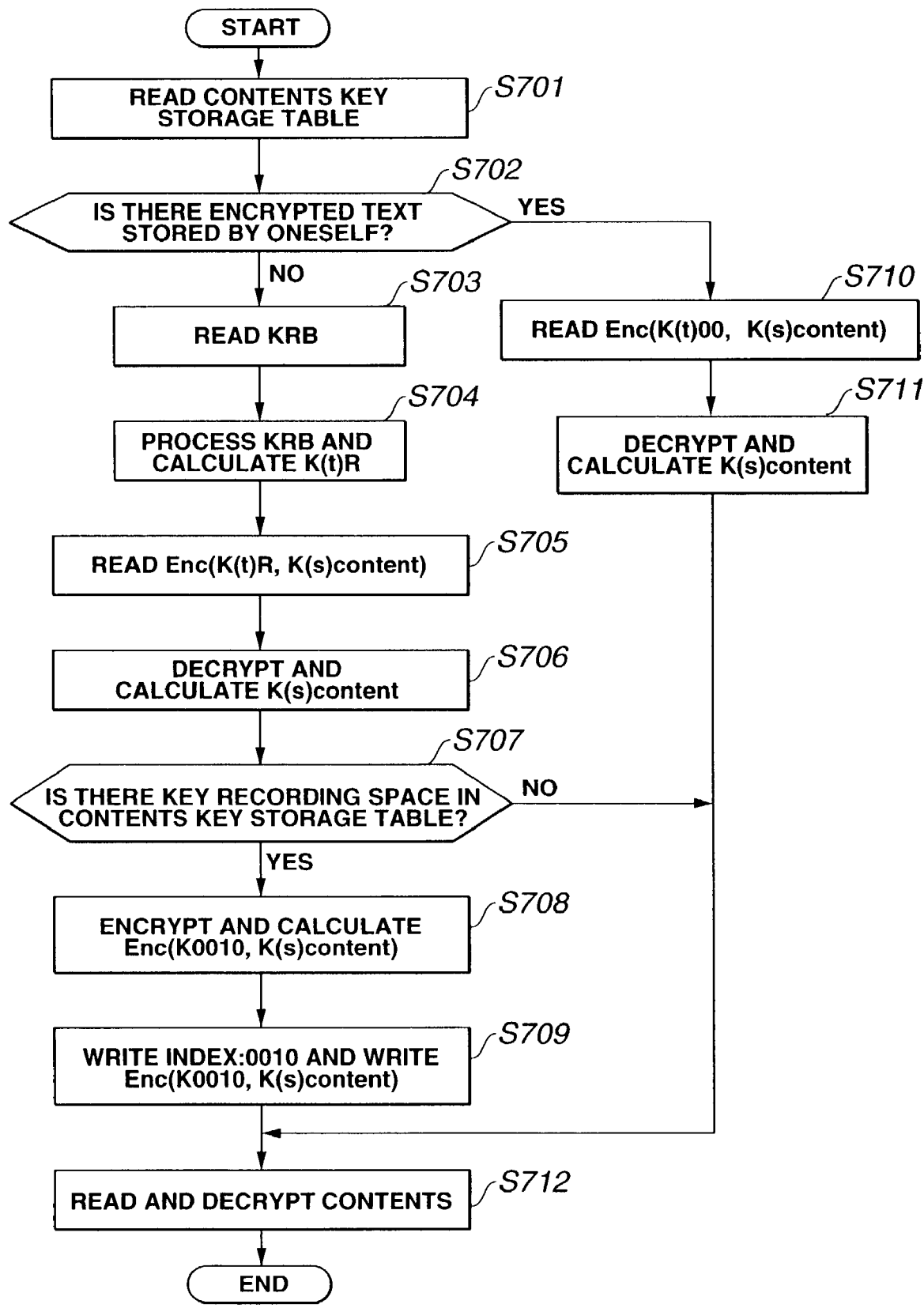
FIG. 23 shows instances of content decryption and key storage processing flow (instance 1) employing a key renewal block (KRB) of a content key in the information recording and/or reproducing device according to the present invention.

FIG. 23 shows the flow of the processing of loading a recording medium on a recording and/or reproducing device, acquiring the encrypted content key and encrypting and reproducing the content for exploiting the content. Although the following explanation is made in connection with reproduction of content from a recording medium, the same holds when the content is acquired from a communication medium.

At step S701, the recording and/or reproducing device reads out the content key storage table, recorded along with the content recorded on the recording medium.

At step S702, the recording and/or reproducing device checks the index part of the content key storage table to see whether or not a leaf number has been allocated to the device itself; that is, by checking whether or not there is encrypted data stored in the device itself. If there is no such data, program moves to step S703 and, if otherwise, to step S710.

At step S703, the recording and/or reproducing device reads out the key renewal block (KRB) from the recording medium. At step S704, the recording and/or reproducing device calculates the key of the node R in the KRB having the identification number: content ID (denoted "s" in FIG. 22) of the content about to be reproduced by the device itself (root key K(t)R), using the KRB read out at step S703, the leaf key the device itself holds in the memory (K0010 in the device 2 of FIG. 18) and the node key (K001, K00, ...) in the device of FIG. 18. Meanwhile, in the present instance, the content key is furnished as it is encrypted by the root key K(t)R. If the renewal node key K(t)xx is set, such as through use of a node key which is lower in order than the root key, the content key can be encrypted using the renewal node key. K(t)xx and a content key is distributed that can be decrypted only by a specified group of devices, such that the renewal node key can be found on calculations.

At step S705, the encrypted value of the content key K(s) content is read out from Enc(K(t)R, K(s) content), using Enc(K(t)R, K(s) content), that is K(t)R.

At step S706, this cryptotext is decrypted using K(t)R to calculate K(s)content. At step S707, the recording and/or reproducing device checks whether or not there is left any space in the content key storage table of the recording medium for recording by the device itself. If there is any space left, the program moves to step S708 and, if otherwise, the program skips the processing at steps S708 and S709 to proceed to step S712.

At step S708, the device encrypts the content key K(s) content, using the leaf key owned solely by the device itself (K0010 in the case of the device 2 of FIG. 18) to create a cryptotext.

At step S709, the cryptotext created at step S708 and the number of the leaf key (leaf number) which is to become the identification information of the device itself (0010 with the device 2 of FIG. 18) is written onto the recording medium. The program then moves to step S712.

If, at step S702, the cryptotext stored in the device itself is found in the content key storage table, the program moves to step S710 where the recording and/or reproducing device reads out the ciphertext from the recording medium.

At step S711, the recording and/or reproducing device decrypts the cryptotext using the device's own leaf key to acquire the content key for the encrypted content. The program then moves to step S712 where the recording and/or reproducing device reads out the content data portion from the recording medium to decrypt it with the content key acquired at steps S706 or S711 in order to acquire decrypted data to be used.

By so doing, it is possible to diminish the processing of calculating the content key with KRB each time the content is used.

In recording the content on the recording medium as shown in FIG. 20, the content transmitted or sent over the communication medium or via the recording medium; that is, the content data portion and the key distributing portion is simply recorded on the recording medium. At this time, the processing of steps S701 to S709 is carried out in the same way as the content reproduction processing of FIG. 23. The processing flow in this case is shown in FIG. 24.

Figure 24:
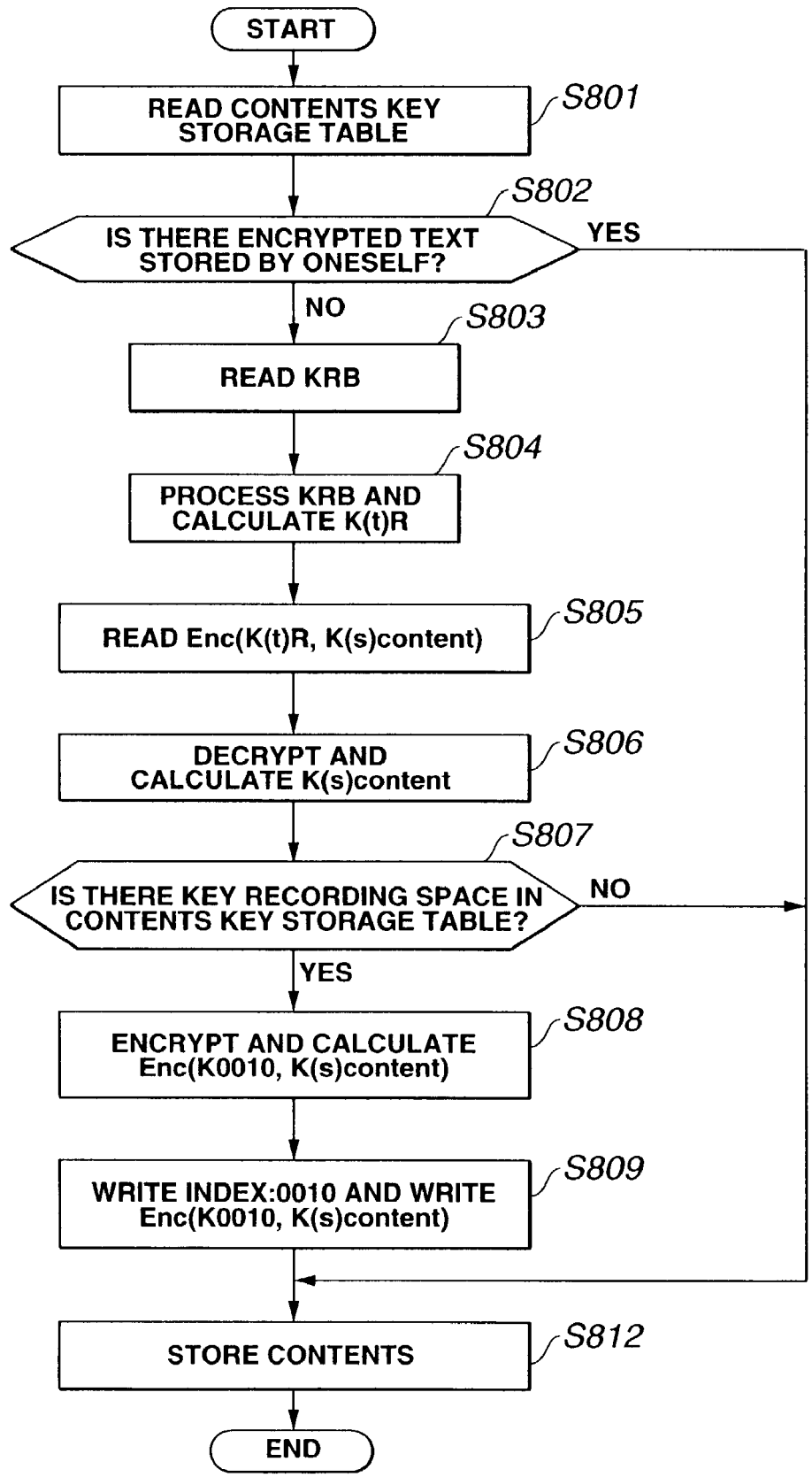
FIG. 24 shows instances of content decryption and key storage processing flow employing a key renewal block (KRB) of a content key in the information recording and/or reproducing device according to the present invention.

For recording the content of FIG. 24, the processing similar to that executed at the time of reproducing the content of FIG. 23 is executed. At step S801, the recording and/or reproducing device reads out the content key storage table as recorded on the recording medium.

At step S802, the recording and/or reproducing device checks the index part of the content key storage table to see whether or not a leaf number has been allocated to the device itself; that is, by checking whether or not there is encrypted data stored in the device itself. If there is no such data, program moves to step S803 and, if otherwise, to step S812.

At step S803, the recording and/or reproducing device reads out the key renewal block (KRB) from the recording medium. At step S804, the recording and/or reproducing device calculates the key of the node R in the KRB having the identification number: content ID (denoted "s" in FIG. 22) of the content, using the KRB read out at step S803, the leaf key the device itself holds in the memory (K0010 in the device 2 of FIG. 18) and the node keys (K001, K00, ...) in the device of FIG. 18, that is the root key K(t)R.

At step S805, the an encrypted value of the content key K(s) content is read out from Enc(K(t)R, K(s) content), using Enc(K(t)R, K(s) content), that is K(t)R.

At step S806, this cryptotext is decrypted, using K(t)R, to calculate K(s)content. At step S807, the recording and/or reproducing device checks whether or not there is any space left for recording by the device itself in the content key storage table of the recording medium. If there is any space left, the program moves to step S808. If there is no space left, the program skips the processing at steps S808 and S809 to proceed to step S812.

At step S808, the device encrypts the content key K(s) content, using the leaf key owned solely by the device itself (K0010 in the case of the device 2 of FIG. 18) to create a cryptotext.

At step S809, the cryptotext created at step S808 and the number of the leaf key 0010 (in the case of the device 2 of FIG. 18), which is to become the identification information of the device itself, are recorded in the content key storage table of the recording medium. The program then moves to step S812.

If, at step S802, cryptotext is found in the content key storage table which was stored by the device itself, the program moves to step S812 to skip S803 to S809.

At step S812, the content transmitted or sent over the communication medium or via recording medium are directly stored on the recording medium. That is, the content data portion and the key distributing portion, being encrypted with the content key K(s) content, are stored on the recording medium. Although the content is stored last time in the present instance, the content is previously encrypted, as shown in FIG. 20, so that the content may be recorded in the recording medium before step S801, that is the recording, of the content may be performed at any desired time.

By encrypting the content key at the time of data recording using a key unique to the device itself, for example, the leaf key, subsequent processing by the recording and/or reproducing equipment to calculate the content key using the KRB can be decreased appreciably.

Figure 25:
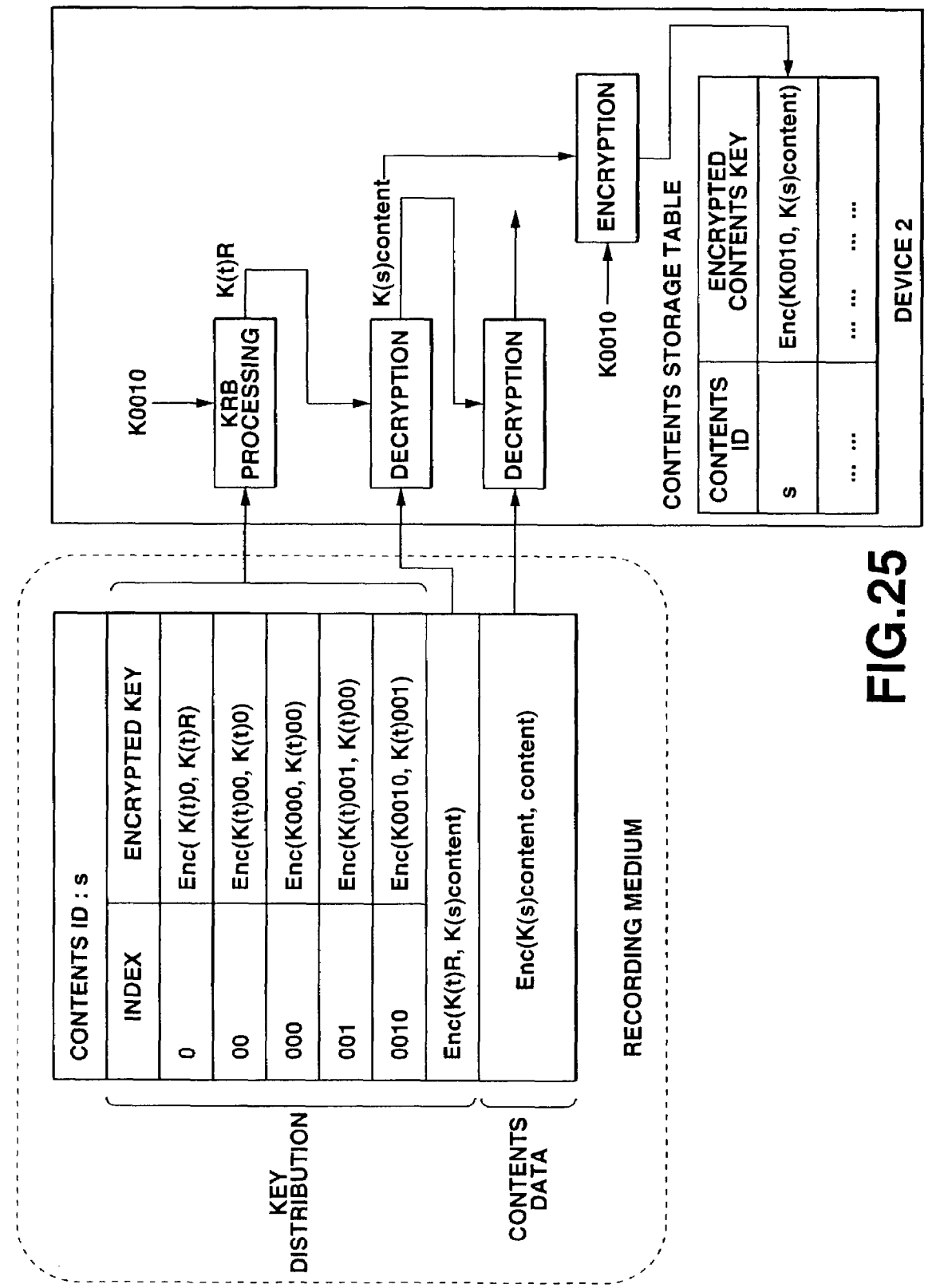
FIG. 25 shows instances of content decryption and key storage processing employing a key renewal block (KRB) of a content key in the information recording and/or reproducing device according to the present invention.

In the above-described embodiments, the tables used by respective recording and/or reproducing devices are placed along with the content in the respective recording media, as explained in FIG. 22. In the present embodiment, as shown in FIG. 25, the content keys are stored in the respective recording and/or reproducing devices, such as in a memory 180 of a recording and/or reproducing device 100 shown in FIG. 1.

In storing the encrypted media keys in the memory 180 of the recording and/or reproducing device 100, such a storage key storage table is used in which encrypted media keys are associated with one another, and in which the media key generation information functions as the index. This takes into account the case of storing the content keys of several different content IDs.

Figure 26:
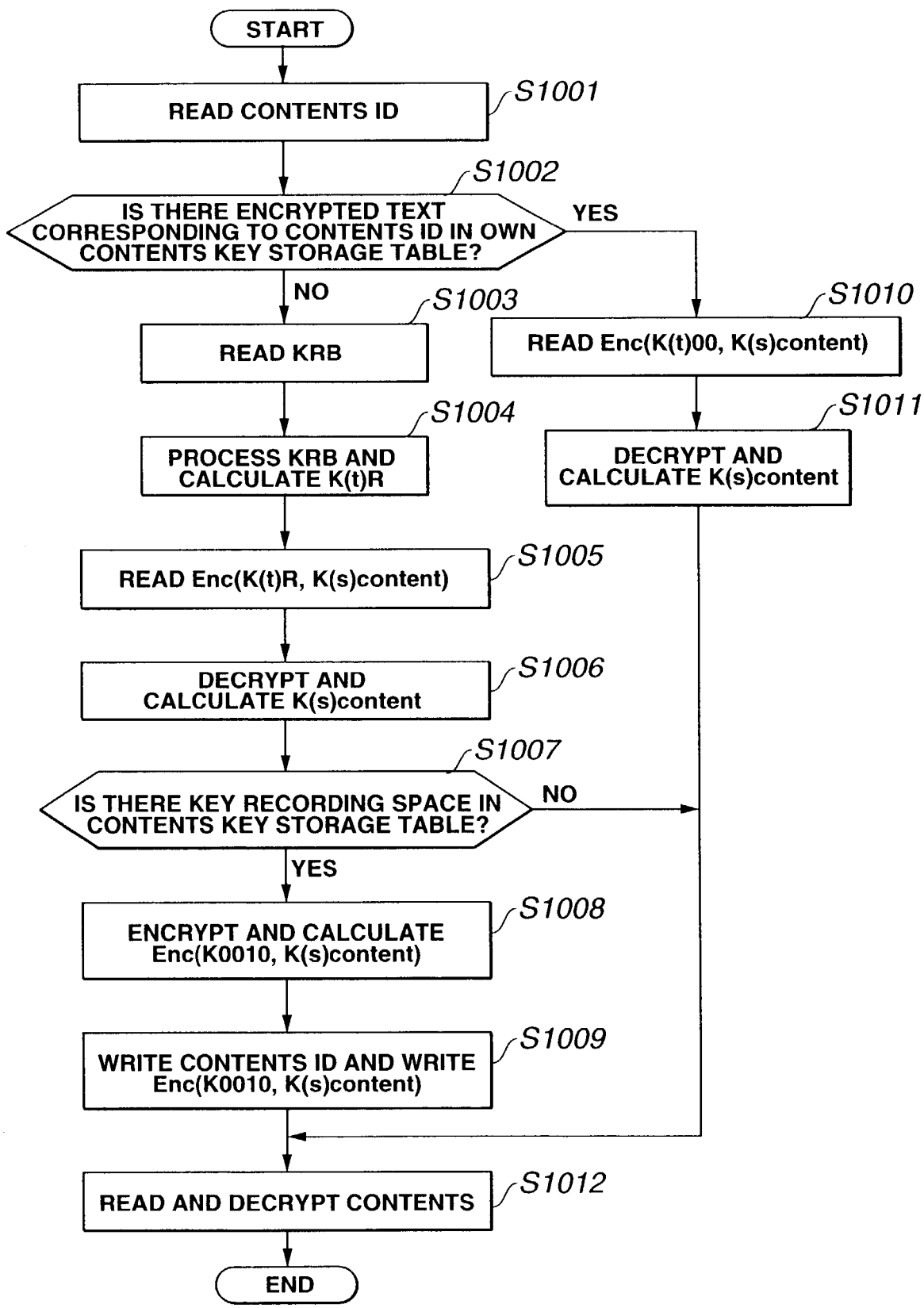
FIG. 26 shows instances of distribution, decryption and key storage processing employing a key renewal block (KRB) of a content key in the information recording and/or reproducing device according to the present invention.

FIG. 26 is a diagram illustrating a processing flow for decrypting and reproducing encrypted content in an example in which the recording and/or reproducing device of the present embodiment uses the content, with the recording medium that stores the encrypted content then being loaded on the recording and/or reproducing device, on the same premises as the above-described embodiments.

At step S1001, the recording and/or reproducing device reads out the content ID (being denoted "s" in the instance of FIG. 25) from the recording medium as an identification number of the content the device undertakes to reproduce.

At step S1002, the recording and/or reproducing device inspects whether or not the content key having the content ID equal to "s" is stored in the content key storage table held by the device itself. If such media key is not stored, the recording and/or reproducing device proceeds to step S1003. If such media key is stored, the device proceeds to step S1010.

The processing of steps S1003 to S1006 is similar to that of S703 to 706 of FIG. 23, respectively, and hence, need not be described in detail. By this processing, the recording and/or reproducing equipment acquires the content key.

At step S1007, the recording and/or reproducing equipment checks whether or not there is any space available for storage of a new content key in the content storage table of its own recording means. If there is any space, the recording and/or reproducing equipment proceeds to step S1008. If no space is available, the equipment skips the processing of steps S1008 and S1009.

At step S1008, as at step S708 of FIG. 23, the equipment encrypts the content key using its own leaf key. At step S1009, the resulting cryptotext is stored in the content key storage table along with the content ID as the identification information. The program then moves to step S1012.

If the cryptotext corresponding to the content ID is found at step S1002 in the content key storage table, the recording and/or reproducing device proceeds to step S1010 to read out the cryptotext from the content key storage table. At step S1011, as at step S711 of FIG. 23, the recording and/or reproducing equipment decrypts the cryptotext using its own leaf key to acquire the content key for the content. The recording and/or reproducing device then proceeds to step S1012.

At step S1012, as at step S712 of FIG. 23, the recording and/or reproducing device reads out the content data portion from the recording medium and proceeds to decrypt the encrypted content using the content key obtained at steps S1006 or S101. From this description processing, the device obtains unencrypted content data, such as music data.

In the above-described embodiment, the recording and/or reproducing device's own leaf key is used for encryption in storing the content key in the content key storage table. However, if safe recording may be made without the security of the content of the content key storage table becoming compromised and possibly disclosed to unauthorized devices, encryption is not mandatory. Although in the above example, the content key encrypted using the device's own leaf key is stored in the content key storage table, in exploiting the content, the content key may be used in storing the content on the recording medium and the content key used for encryption may be stored in the content key storage table, as described above.

The above-described embodiments may also be combined such that the content key storage table is owned by both the recording medium and the recording and/or reproducing equipment.

In the above example, the term "key renewal block" (KRB) is used to denote data used for distributing the key. However, it should be apparent from the foregoing description that the key renewal block is not limited to key renewal but may be applied to key distribution in general.

For protecting the benefit of a content copyright owner, for example, it is necessary for the licensed device to control the copying of the content.

In recording the content on the recording medium, it is necessary to check whether or not the copying of the content is allowed (copying enabled) so that the content allowed to be copying is can be recorded. If the content recorded on a recording medium is to be reproduced and output, it is also necessary to prevent subsequent illicit copying.

With reference to FIGS. 27A, 27B, 28A and 28B, the processing of the recording and/or reproducing device of FIG. 1 will be described for an example in which the copying of the content is controlled.

Figure 27B:
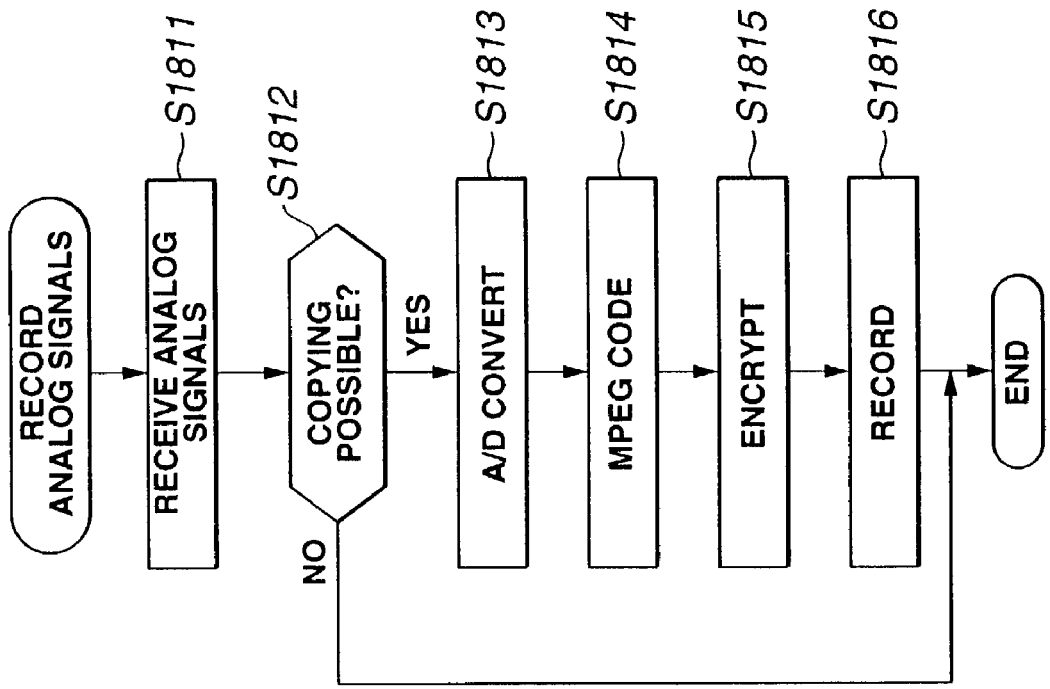
FIGS. 27A and 27B are flowcharts for illustrating copying controlling processing in data recording processing in the information recording and/or reproducing device according to the present invention.
Figure 27A:
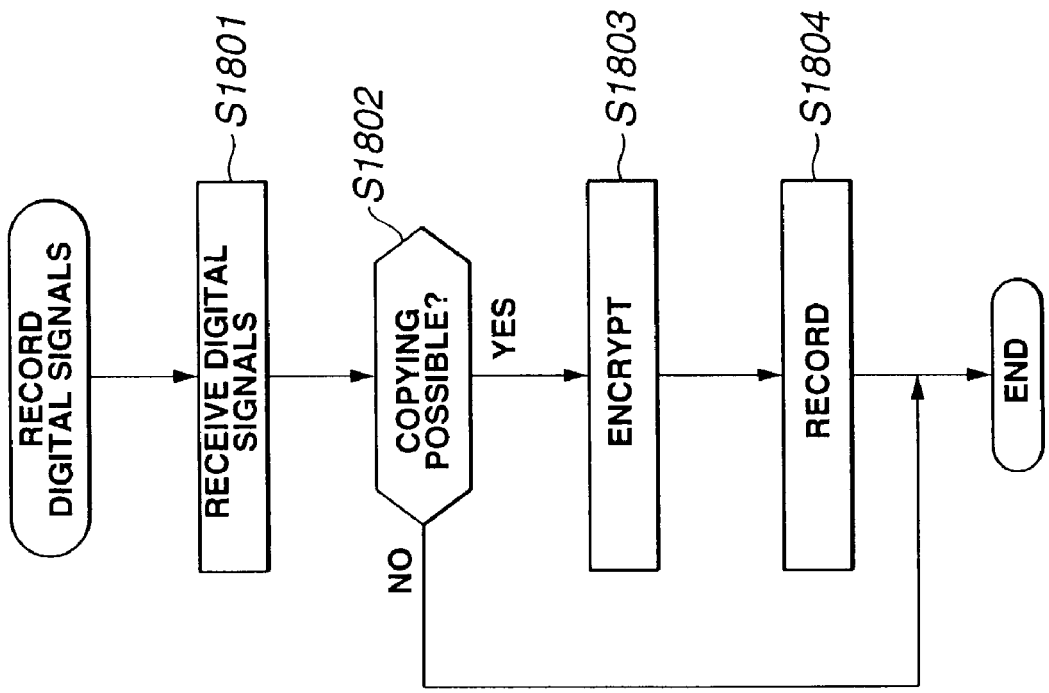

First, the recording processing shown in the flowchart of FIG. 27A is carried out for recording the content of incoming digital signals. Here, the recording and/or reproducing unit 100 of FIG. 1 is taken as an example. If the content of the digital signals (digital content) is sent over e.g., a 1394 serial bus to the input/output I/F 120, the input/output I/F 120 at step S1801 receives the digital content. The program then moves to step S1802.

At step S1802, the input/output I/F 120 checks whether or not the received digital content is allowed to be copied. If the content received by the input/output I/F 120 is not in encrypted form, for example, if plaintext (unencrypted) content not employing the aforementioned DTCP is supplied to the input/output I/F 120, the content is verified as allowing copying.

It is also assumed that the recording and/or reproducing device conforms to DTCP and executes processing in accordance with the DTCP. The DTCP provides 2-bit EMI (encryption media indicator) as the information for controlling the copying. When the EMI has a value of 00B, this indicates that the content can be copied(Copy-freely), whereas when the EMI has a value of 01B, this denotes that the content does not allow any further copying (No-more-copies). When the EMI has a value of 10B, this indicates that the content may be copied only once (Copy-one-generation). When the EMI has a value of 11B, this denotes that the copying is not allowed at all (Copy-never).

If EMI included in the signal supplied to the input/output I/F 120 of the recording and/or reproducing device 100 has a value of "Copy-freely" or "Copy-one-generation", the content is verified to be allowed for copying. If the EMI has a value of "No-more-copies" or "Copy-never", the content is verified to not allow for copying If the content is found at step S1802 to not allow copying, the steps S1803 to S1804 are skipped to terminate the recording. Thus, in this case, no content is recorded on the recording medium.

If the content is found at step S1802 to allow copying, the program moves to step S1803 such that the processing similar to that at steps S202, S203 in FIG. 2A is carried out at steps S1803 and S1804. That is, the encryption processing in the encryption processing means 150 is executed, and the resulting encrypted content is recorded on the recording medium 195 to terminate the recording processing.

Meanwhile, the EMI contained in the digital signals is supplied to the input/output I/F 120, such that when the digital content is recorded the EMI and any other information denoting the copy controlling state, such as embedded CCI in DTCP are also recorded along with the digital content.

As a general rule, during recording, when the EMI has a value of "Copy-one-generation" the value is changed to "No-more-copies", in order to prevent further copying.

In recording the content of incoming analog signals, recording processing is performed in accordance with the flowchart of FIG. 27B. The processing of FIG. 27B is now explained. When the content of analog signals (analog content) are fed to the input/output I/F 140, the input/output I/F 140 at step S1811 receives the analog content and proceeds to step S1812 to verify whether or not the thus received analog content is allowed to be copied.

The processing of check at step S1812 is performed based on whether or not a macro-vision signal or a CGMS-A (Copy Generation Management System-Analog) signal is included in the signal received by the input/output I/F 140. The macro-vision signal is such a signal that becomes noise on recording on a video cassette tape of the VHS system. If this signal is contained in the signal received by the input/output I/F 140, the analog content is verified as being unable to be copied.

Moreover, the CGMS-A signal denotes the CGMS signal used in controlling copying of the digital signals, which is also applied to control the copying of the analog signals. The CGMS-A signal indicates whether the content is "Copy-freely", "Copy-one-generation" or "Copy-never".

Thus, if the CGMS-A signal is included in the signal received by an input/output I/F 140, and the CGMS-A signal denotes Copy-freely or Copy-one-generation, the analog content is verified as allowed to be copied. If the CGMS-A signal denotes "Copy-never", the analog signals are verified to be not allowed to be copied.

If neither macro-vision signal nor CGMS-A signal is contained in the input/output I/F 140, the analog signals are verified to be allowed to be copied.

If the analog signals are determined at step S1812 as not allowed to be copied, the steps S1823 to S1816 are skipped to terminate the recording processing. Thus, in this case, no content is recorded on the recording medium 195.

If it is verified at step S1812 that the analog content is not allowed to be copied the program moves to step S1813. In the steps S1813 to S1816, the processing similar to that at steps S222 to S225 in FIG. 2B is performed, whereby the content is converted into digital data, MPEG encoded, decrypted and recorded on the recording medium to complete the recording processing.

If, in an example in which the CGMS-A signals are included in the analog signals received by the input/output I/F 140, and the analog content is to be recorded on the recording medium, the CGMS-A signals are also recorded on the recording medium. In this case, the information representing "Copy-one-generation" is converted into the denotation "No-more-copies", in order to prohibit further copying, and is then recorded in that form. This, however, is not valid if a rule is adopted in a system which states: "The 'Copy-one-generation' copy control information is recorded without conversion to 'No-more-copies', but is handled as 'No-more copies' ".

If the content recorded on a recording medium are reproduced and output as digital content to outside, the reproducing processing is performed in accordance with the flowchart of FIG. 28A. The processing in accordance with FIG. 28A is now explained. First, at steps S1901 and S1902, the processing similar to that at steps S301 and S302 of FIG. 3A is carried out, whereby the encrypted content read out from the recording medium is decoded by the encryption processing means 150 so that the decrypted digital content is sent over the bus 110 to the input/output I/F 120.

The input/output I/F 120 at step S1903 checks whether or not the digital content supplied thereto is allowed for subsequent copying. That is, when the EMI, or other information indicating the copying controlling state (copying controlling information) is not contained in the digital content sent to the input/output I/F 120, the content is determined to be allowed for subsequent copying.

If the copying controlling information, such as EMI, is contained in the digital content supplied to the input/output I/F 120, that is if EMI is recorded in accordance with the DTCP standard during content recording, and the recorded EMI state is, "Copy-freely", the content is determined to be allowed for subsequent copying. If the EMI is No-more copies, the content is determined not to be allowed for subsequent copying.

Usually, the copy controlling information, such as EMI, is not recorded with the value "Copy-one-Generation" or "Copying-never". The reason is that the EMI of the Copy-one-generation is converted during recording into No-more-copies, but the digital content having the EMI of Copy-never is not recorded on the recording medium. However, this is not valid if a rule is adopted in a system which states: "The 'Copy-one-generation' copy control information is recorded without conversion to 'No-more-copies', but is handled as 'No-more copies'.

If, at step S1903, the content is determined to be allowed for copying subsequently, the program moves to step S1904 where the input/output I/F 120 outputs the digital content externally to terminate the reproducing processing.

If, at step S1903, the content is found to be allowed for subsequent copying the program moves to step S1905 where the input/output I/F 120 outputs the digital content externally in accordance with the DTCP standard in such a form as to prohibit its subsequent copying and terminate the reproducing processing.

That is, if, for example, the copy controlling information, such as recorded EMI has a value of 'No-more copies', or if in a given system, there is a default rule stating, that: "the 'Copy-one-generation' copy controlling information is recorded without conversion to 'No-more-copies' but is treated as 'No-more copies' " and the EMI recorded under this condition is 'Copy-one-generation', the content is not allowed for further copying.

In this way, the input/output I/F 120 effects reciprocal authentication with respect to counterpart devices, in accordance with the DTCP standards. If the counterpart is an authentic device, herein the device conforming to the DTCP standard, the digital content is encrypted and output in this form to outside.

If the content recorded on the recording medium is reproduced and output to outside as analog content, the reproduction processing is performed in accordance with the flowchart of FIG. 28B. The processing according to FIG. 28B is now explained. In steps S1911 to S1914, the processing similar to that at steps S321 to S324 is performed. That is, the readout, decryption, MPEG decoding and D/A conversion of the encrypted content are carried out. The resulting analog content is received by the input/output I/F 140.

At step S1915, the input/output I/F 140 is verified as to whether or not the content supplied thereto is enabled for subsequent copying. For example, if copy controlling information, such as EMI, is not found recorded in the recorded content, the content is determined to be enabled for copying subsequently.

If the copying controlling information such as EMI is recorded during recording of the content in accordance with, for example, the DTCP standard, and the value is 'Copy-freely', the content is determined to be enabled for further copying.

On the other hand, if, for example, the copying controlling information, such as recorded EMI has a value of 'No-more copies', or if, in a given system, there is a default rule stating that: "the 'Copy-one-generation' copy controlling information is recorded without conversion to 'No-more-copies' but is treated as 'No-more copies' " and the EMI recorded under this condition is 'Copy-one-generation', the analog content is determined to not allow further copying.

For example, if the CGMS-A signals are contained in the analog content supplied to the input/output I/F 140, such that, during the recording of the content, the CGMS-A signals are recorded along with the content, and the CGMS-A signals have the value 'Copy-freely', the analog signals are determined to be enabled for subsequent copying. However, if the CGMS-A signals have the value 'Copy-never', the analog content is determined to not allow subsequent copying.

If, at step S1915, the content is determined to be enabled for subsequent copying, the program moves to step S1916 where the input/output I/F 140 directly outputs the analog signals supplied thereto, and terminates the reproduction processing.

On the other hand, if, at step S1915, the content is determined to not be enabled for subsequent copying, the program moves to step S1917 where the input/output I/F 140 outputs the analog content in a manner of not allowing subsequent copying, and terminates the reproduction processing.

That is, the content is not allowed to be subsequently copied when, for example, the copying controlling information, such as recorded EMI, has the value 'No-more copies', or if, in a given system, there is set a default rule stating that: "the 'Copy-one-generation' copy controlling information is recorded without conversion to 'No-more-copies' but is treated as 'No-more copies'" and the copy controlling information such as EMI recorded under this condition has a value 'Copy-one-generation'.

In such case, the input/output I/F 140 appends e.g., macro-vision signals or CGMS-A signals indicating 'Copy-never' to the analog signals to output the resulting signals externally. If the CGMS-A signals recorded indicate 'Copy-never', the content is not allowed to be further copied. Then, the input/output I/F 4 outputs the content externally, along with the analog content, after converting the CGMS-A signals to 'Copy-never'.

By recording or reproducing the content as the content is controlled for copying, as described above, it is possible to prevent the copying outside the range allowed for the content (i.e., to prevent illicit copying).

Figure 29:
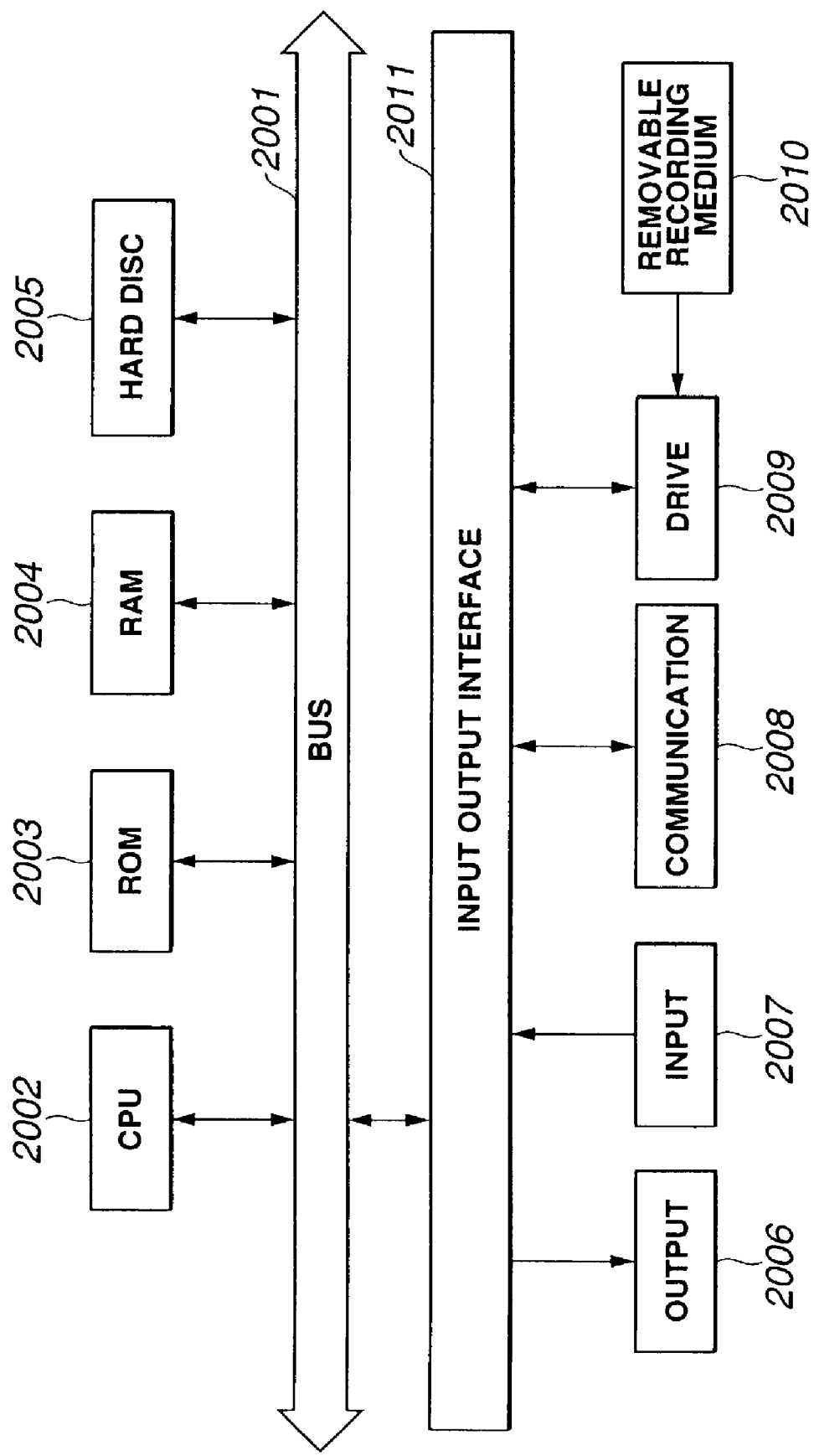
FIG. 29 is a block diagram showing a structure of processing means in case data processing is executed by software in the information recording and/or reproducing device according to the present invention.

The above-described sequence of operations may be performed not only by hardware but also by software. For example, although the encryption processing means 150 may be arranged as encrypting/decrypting LSI, it may also be arranged by a configuration in which the program is executed by a general-purpose computer or a one-chip micro-computer. If this sequence of processing operations are executed by software, the program forming the software is installed on a general-purpose computer or a one-chip micro-computer. FIG. 29 shows an illustrative structure of an embodiment of a computer on which a program is installed for executing the above-described sequence of operations.

The program may be pre-recorded on the hard disc 2005 or on the ROM 2003 as a recording medium built into a computer. Alternatively, the program may be temporarily or permanently stored (recorded) in a removable recording medium, such as a floppy disc, CD-ROM (compact disc read only memory), MO (magneto optical) disc, DVD (digital versatile disc), a magnetic disc or on a semiconductor memory. Such removable recording medium 2010 may also be furnished as a so-called package software.

Meanwhile, the program may be installed on a computer from the above-mentioned removable recording medium 2010, transmitted over a radio path to the computer from a downloading site via an artificial satellite for digital satellite broadcasting, or transmitted to the computer over a cable through the networks, such as Internet. The computer is able to receive the transmitted program by a communication unit 2008 to install the program on a built-in hard disc 2005.

The computer has a built-in CPU (central processing unit), to which CPU 2002 an input/output interface 2011 is connected over a bus 2002. If a command is input over input/output interface 2011 by a user acting on the input unit 2007, such as a keyboard or a mouse, the program stored in the ROM (read-only memory) 2003 is executed accordingly.

Alternatively, the CPU 2002 loads a program stored in the hard disc 2005, a program transmitted from a satellite or through a network received by a communication unit 2008 and installed on the hard disc 2005, or a program read out from the removable recording medium 2110, loaded on a drive 2009 so as to be installed on the hard disc 2005 and loaded into the RAM (random access memory) 2004, for execution.

Thus, the CPU 2002 performs the processing conforming to the above-described flowchart, or in accordance with the configuration of the block diagram described above. The CPU 2002 outputs the processed results via e.g., input/output interface 2011 from an output unit 2006 formed e.g., by an LCD (liquid crystal display) or a loudspeaker, for transmission from the communication unit 2008 or recording on the hard disc 2005.

It should be noted that, in the present specification, the processing steps stating the program designed for the computer to carry out a variety of processing operations are not necessarily processed chronologically in a sequence stated in the flowchart, but the processing also may include processing carried out in parallel or batch-wise, such as parallel processing or processing by an object.

The program may be processed by one computer or by a plurality of computers in a distributed fashion. The program may also be transferred to and executed by a remote computer.

In the present embodiment, the description has been made mainly for an example in which the block for encrypting/decrypting the content is formed by a one-chip encrypting/decrypting LSI. However, the content encrypting/decrypting block may also be realized by one software module executed by the CPU 170 shown in FIG. 1.

The present invention has so far been elucidated with reference to certain preferred embodiments. However, it is apparent that the present invention can be modified by the skilled artisan by correction or substitution of the embodiments within without departing from the true scope and spirit of the invention. That is, the present invention has been disclosed by way of illustration. Hence the scope of the present invention should be defined in light of the claims and not limited by the embodiments which are set forth herein by way of example.

With the information recording and/or reproducing device according to the present invention, described above, in which, by the key distributing configuration of the tree structure, renewal data of a content cipher key, such as a media key, is transmitted along with the renewal block (KRB), and in which, after the recording and/or reproducing device has acquired the media key of a certain recording medium by calculations, the media key so acquired is encrypted using a cipher key unique to the recording and/or reproducing device, such as a leaf key, for storage in a recording medium or in a memory of the recording and/or reproducing device, the media key can be calculated on decrypting the encrypted key only once when the recording and/or reproducing device next uses the recording medium. Thus, it is possible to diminish the volume of calculations, such as those involved in the KRB decrypting processing operations, which otherwise become necessary when the recording and/or reproducing device accesses the recording medium.

By the key distributing configuration of the tree structure, the content key as the content cipher key is transmitted along with the key renewal block (KRB) and, after the recording and/or reproducing device has acquired a content key of certain content on calculations, the so acquired content key is encrypted, using the cipher key proper to the recording and/or reproducing device, to form a cryptotext, which is then stored on a recording medium or in a memory of the recording and/or reproducing device. Thus, the content key can be calculated on decrypting the cryptotext only once when the recording and/or reproducing device next uses the content. The result is the reduced processing volume such as KRB decrypting processing needed each time the recording and/or reproducing device uses the content.

The invention claimed is:

1. An information processing device operable within a node of a hierarchical network of nodes having a hierarchical tree structure, said information processing device comprising:

storage operable to store one or more node keys, each node key being unique to one node of the network, and a leaf key, the leaf key being unique to the information processing device and unique in relation to a leaf key held by any other node within the hierarchical network of nodes; and an encryption processor operable to:

decrypt an encrypted renewal node key of a key block to obtain a renewal node key using at least one of the node key stored in the storage or a leaf key belonging to a lower layer of the hierarchical network and stored in the storage, calculate a decryption key using the obtained renewal node key, encrypt the decryption key using the leaf key of the information processing device, store the encrypted decryption key in at least one of the storage or on a recording medium together with a generation number, the generation number representing renewal information for the decryption key, and use the generation number to determine whether it is necessary to decrypt a key block corresponding to the generation number to obtain the decryption key.

2. An information processing method, comprising:

storing one or more node keys and a leaf key in an information processing device of one node of a hierarchical information processing device of one node of a hierarchical network of nodes having a hierarchical tree structure, each node key being unique to one node of the network, the leaf key being unique to the information processing device such that each leaf key of each information processing device of the network is unique with respect to a leaf key of any other information processing device of the network;

decrypting a key block including an encrypted renewal node key, the renewal node key being encrypted using at least one of the stored node key for the node or a leaf key belonging to a lower layer of the hierarchical network, at least one of the stored node key and the stored leaf key being used to decrypt the encrypted renewal node key to obtain a renewal node key;

using the obtained renewal node key to calculate a decryption key usable to decrypt encrypted data stored on at least one of the information processing device or on a recording medium;

encrypting the decryption key using the leaf key of the information processing device; and storing the encrypted decryption key on at least one of the information processing device or on the recording medium together with a generation number representing renewal information for the decryption key;

using the stored generation number to determine whether the encrypted decryption key is stored on the at least one of the information processing device or on the recording medium; and when it is determined that the encrypted decryption key is stored on the at least one of the information processing device or on the recording medium, using the leaf key to decrypt the encrypted decryption key to obtain the decryption key and using the decryption key to decrypt the encrypted data without having to decrypt the key block.

* * * * *